US012756130B2

(12) United States Patent
Gray et al.

(10) Patent No.: US 12,756,130 B2
(45) Date of Patent: Oct. 6, 2026

(54) HIGH PERFORMANCE MEZZANINE CONNECTOR WITH LOW STACK HEIGHT

(71) Applicant: Amphenol Corporation, Wallingford, CT (US)

(72) Inventors: Mark R. Gray, York, PA (US); Benjamin Reed Staudt, Harrisburg, PA (US)

(73) Assignee: Amphenol Corporation, Wallingford, CT (US)

( * ) Notice: Subject to any disclaimer, the term of this patent is extended or adjusted under 35 U.S.C. 154(b) by 393 days.

(21) Appl. No.: 18/472,078

(22) Filed: Sep. 21, 2023

(65) Prior Publication Data

US 2024/0106153 A1 Mar. 28, 2024

Related U.S. Application Data

(60) Provisional application No. 63/409,407, filed on Sep. 23, 2022.

(51) Int. Cl.
*H01R 13/50* (2006.01)
*H01R 12/71* (2011.01)
(Continued)

(52) U.S. Cl.
CPC .......... *H01R 13/50* (2013.01); *H01R 12/716* (2013.01); *H01R 12/73* (2013.01);
(Continued)

(58) Field of Classification Search
CPC ...... H01R 13/50; H01R 12/716; H01R 12/73; H01R 13/6477; H01R 12/71;
(Continued)

(56) References Cited

U.S. PATENT DOCUMENTS

| | | | |
|---|---|---|---|
| 6,019,616 | A | 2/2000 | Yagi et al. |
| 6,042,394 | A | 3/2000 | Mitra et al. |

(Continued)

FOREIGN PATENT DOCUMENTS

| | | | |
|---|---|---|---|
| CN | 201222548 | Y | 4/2009 |
| CN | 201252183 | Y | 6/2009 |

(Continued)

OTHER PUBLICATIONS

Chinese Invalidation Request dated Jun. 1, 2021 in connection with Chinese Application No. 200680023997.6.

(Continued)

*Primary Examiner* — Justin M Kratt
(74) *Attorney, Agent, or Firm* — Wolf, Greenfield & Sacks, P.C.

(57) ABSTRACT

A low-profile mezzanine connector. The connector is simple to manufacture and can be reliably formed even with a stack height of 4 mm or less yet has high signal integrity. The connector has a field of identically shaped contacts that are functionally differentiated through features of the housing, including lossy material in patches with narrower projections electrically coupled to contacts designated as ground contacts. The mating portions of the contacts are adjacent a wall of the housing, which is tapered to increase the effective dielectric constant in the vicinity of the signal contacts. Each contact may have a hole in it to engage an insertion tool to enable repeatable and stable insertion of the contacts into a housing. The footprint for mounting the connector to a PCB may include signal vias offset from the mounting pads for signal contacts.

28 Claims, 11 Drawing Sheets

(51) Int. Cl.

| | |
|---|---|
| ***H01R 12/73*** | (2011.01) |
| ***H01R 13/6477*** | (2011.01) |
| *H01R 13/502* | (2006.01) |
| *H01R 13/504* | (2006.01) |
| *H01R 13/6473* | (2011.01) |
| *H01R 13/6474* | (2011.01) |
| *H01R 13/6585* | (2011.01) |

(52) U.S. Cl.

CPC ......... *H01R 13/6477* (2013.01); *H01R 12/71* (2013.01); *H01R 12/712* (2013.01); *H01R 12/714* (2013.01); *H01R 13/502* (2013.01); *H01R 13/504* (2013.01); *H01R 13/6473* (2013.01); *H01R 13/6474* (2013.01); *H01R 13/6585* (2013.01)

(58) Field of Classification Search

CPC .. H01R 12/712; H01R 12/714; H01R 13/502; H01R 13/504; H01R 13/6473; H01R 13/6474; H01R 13/6585

See application file for complete search history.

(56) References Cited

U.S. PATENT DOCUMENTS

| | | | |
|---|---|---|---|
| 6,083,047 | A | 7/2000 | Paagman |
| 6,102,747 | A | 8/2000 | Paagman |
| 6,116,926 | A | 9/2000 | Ortega et al. |
| 6,120,306 | A | 9/2000 | Evans |
| 6,123,554 | A | 9/2000 | Ortega et al. |
| 6,132,255 | A | 10/2000 | Verhoeven |
| 6,132,355 | A | 10/2000 | Derie |
| 6,135,824 | A | 10/2000 | Okabe et al. |
| 6,146,202 | A | 11/2000 | Ramey et al. |
| 6,152,274 | A | 11/2000 | Blard et al. |
| 6,152,742 | A | 11/2000 | Cohen et al. |
| 6,152,747 | A | 11/2000 | McNamara |
| 6,163,464 | A | 12/2000 | Ishibashi et al. |
| 6,168,469 | B1 | 1/2001 | Lu |
| 6,171,115 | B1 | 1/2001 | Mickievicz et al. |
| 6,171,149 | B1 | 1/2001 | van Zanten |
| 6,174,202 | B1 | 1/2001 | Mitra |
| 6,174,203 | B1 | 1/2001 | Asao |
| 6,174,944 | B1 | 1/2001 | Chiba et al. |
| 6,179,651 | B1 | 1/2001 | Huang |
| 6,179,663 | B1 | 1/2001 | Bradley et al. |
| 6,196,853 | B1 | 3/2001 | Harting et al. |
| 6,203,396 | B1 | 3/2001 | Asmussen et al. |
| 6,206,729 | B1 | 3/2001 | Bradley et al. |
| 6,210,182 | B1 | 4/2001 | Elco et al. |
| 6,210,227 | B1 | 4/2001 | Yamasaki et al. |
| 6,217,372 | B1 | 4/2001 | Reed |
| 6,227,875 | B1 | 5/2001 | Wu et al. |
| 6,231,391 | B1 | 5/2001 | Ramey et al. |
| 6,238,245 | B1 | 5/2001 | Stokoe et al. |
| 6,267,604 | B1 | 7/2001 | Mickievicz et al. |
| 6,273,758 | B1 | 8/2001 | Lloyd et al. |
| 6,293,827 | B1 | 9/2001 | Stokoe |
| 6,296,496 | B1 | 10/2001 | Trammel |
| 6,299,438 | B1 | 10/2001 | Sahagian et al. |
| 6,299,483 | B1 | 10/2001 | Cohen et al. |
| 6,299,484 | B2 | 10/2001 | Van Woensel |
| 6,299,492 | B1 | 10/2001 | Pierini et al. |
| 6,328,572 | B1 | 12/2001 | Higashida et al. |
| 6,328,601 | B1 | 12/2001 | Yip et al. |
| 6,333,468 | B1 | 12/2001 | Endoh et al. |
| 6,343,955 | B2 | 2/2002 | Billman et al. |
| 6,343,957 | B1 | 2/2002 | Kuo et al. |
| 6,347,962 | B1 | 2/2002 | Kline |
| 6,350,134 | B1 | 2/2002 | Fogg et al. |
| 6,358,088 | B1 | 3/2002 | Nishio et al. |
| 6,358,092 | B1 | 3/2002 | Siemon et al. |
| 6,364,711 | B1 | 4/2002 | Berg et al. |
| 6,364,713 | B1 | 4/2002 | Kuo |
| 6,375,510 | B2 | 4/2002 | Asao |
| 6,379,188 | B1 | 4/2002 | Cohen et al. |
| 6,380,485 | B1 | 4/2002 | Beaman et al. |
| 6,392,142 | B1 | 5/2002 | Uzuka et al. |
| 6,394,839 | B2 | 5/2002 | Reed |
| 6,396,712 | B1 | 5/2002 | Kuijk |
| 6,398,588 | B1 | 6/2002 | Bickford |
| 6,409,543 | B1 | 6/2002 | Astbury, Jr. et al. |
| 6,428,344 | B1 | 8/2002 | Reed |
| 6,431,914 | B1 | 8/2002 | Billman |
| 6,435,913 | B1 | 8/2002 | Billman |
| 6,435,914 | B1 | 8/2002 | Billman |
| 6,441,313 | B1 | 8/2002 | Novak |
| 6,454,605 | B1 | 9/2002 | Bassler et al. |
| 6,461,202 | B2 | 10/2002 | Kline |
| 6,471,549 | B1 | 10/2002 | Lappohn |
| 6,478,624 | B2 | 11/2002 | Ramey et al. |
| 6,482,017 | B1 | 11/2002 | Van Doorn |
| 6,491,545 | B1 | 12/2002 | Spiegel et al. |
| 6,503,103 | B1 | 1/2003 | Cohen et al. |
| 6,506,076 | B2 | 1/2003 | Cohen et al. |
| 6,517,360 | B1 | 2/2003 | Cohen |
| 6,520,803 | B1 | 2/2003 | Dunn |
| 6,527,587 | B1 | 3/2003 | Ortega et al. |
| 6,528,737 | B1 | 3/2003 | Kwong et al. |
| 6,530,790 | B1 | 3/2003 | McNamara et al. |
| 6,533,613 | B1 | 3/2003 | Turner et al. |
| 6,537,087 | B2 | 3/2003 | McNamara et al. |
| 6,538,524 | B1 | 3/2003 | Miller |
| 6,538,899 | B1 | 3/2003 | Krishnamurthi et al. |
| 6,540,522 | B2 | 4/2003 | Sipe |
| 6,540,558 | B1 | 4/2003 | Paagman |
| 6,540,559 | B1 | 4/2003 | Kemmick et al. |
| 6,541,712 | B1 | 4/2003 | Gately et al. |
| 6,544,072 | B2 | 4/2003 | Olson |
| 6,544,647 | B1 | 4/2003 | Hayashi et al. |
| 6,551,140 | B2 | 4/2003 | Billman et al. |
| 6,554,647 | B1 | 4/2003 | Cohen et al. |
| 6,565,387 | B2 | 5/2003 | Cohen |
| 6,579,116 | B2 | 6/2003 | Brennan et al. |
| 6,582,244 | B2 | 6/2003 | Fogg et al. |
| 6,585,540 | B2 | 7/2003 | Gutierrez et al. |
| 6,592,381 | B2 | 7/2003 | Cohen et al. |
| 6,595,802 | B1 | 7/2003 | Watanabe et al. |
| 6,602,095 | B2 | 8/2003 | Astbury, Jr. et al. |
| 6,607,402 | B2 | 8/2003 | Cohen et al. |
| 6,608,762 | B2 | 8/2003 | Patriche |
| 6,609,933 | B2 | 8/2003 | Yamasaki |
| 6,612,871 | B1 | 9/2003 | Givens |
| 6,616,482 | B2 | 9/2003 | De La Cruz et al. |
| 6,616,864 | B1 | 9/2003 | Jiang et al. |
| 6,621,373 | B1 | 9/2003 | Mullen et al. |
| 6,652,318 | B1 | 11/2003 | Winings et al. |
| 6,652,319 | B1 | 11/2003 | Billman |
| 6,655,966 | B2 | 12/2003 | Rothermel et al. |
| 6,663,427 | B1 | 12/2003 | Billman et al. |
| 6,663,429 | B1 | 12/2003 | Korsunsky et al. |
| 6,692,272 | B2 | 2/2004 | Lemke et al. |
| 6,705,895 | B2 | 3/2004 | Hasircoglu |
| 6,706,974 | B2 | 3/2004 | Chen et al. |
| 6,709,294 | B1 | 3/2004 | Cohen et al. |
| 6,712,648 | B2 | 3/2004 | Padro et al. |
| 6,713,672 | B1 | 3/2004 | Stickney |
| 6,717,825 | B2 | 4/2004 | Volstorf |
| 6,722,897 | B1 | 4/2004 | Wu |
| 6,741,141 | B2 | 5/2004 | Kormanyos |
| 6,743,057 | B2 | 6/2004 | Davis et al. |
| 6,749,444 | B2 | 6/2004 | Murr et al. |
| 6,762,941 | B2 | 7/2004 | Roth |
| 6,764,341 | B2 | 7/2004 | Lappoehn |
| 6,776,645 | B2 | 8/2004 | Roth et al. |
| 6,776,659 | B1 | 8/2004 | Stokoe et al. |
| 6,786,771 | B2 | 9/2004 | Gailus |
| 6,792,941 | B2 | 9/2004 | Andersson |
| 6,806,109 | B2 | 10/2004 | Furuya et al. |
| 6,808,419 | B1 | 10/2004 | Korsunsky et al. |
| 6,808,420 | B2 | 10/2004 | Whiteman, Jr. et al. |
| 6,814,519 | B2 | 11/2004 | Policicchio et al. |
| 6,814,619 | B1 | 11/2004 | Stokoe et al. |

(56) References Cited

U.S. PATENT DOCUMENTS 6,816,486 B1 11/2004 Rogers
6,817,870 B1 11/2004 Kwong et al.
6,823,587 B2 11/2004 Reed
6,830,478 B1 12/2004 Ko et al.
6,830,483 B1 12/2004 Wu
6,830,489 B2 12/2004 Aoyama
6,857,899 B2 2/2005 Reed et al.
6,872,085 B1 3/2005 Cohen et al.
6,875,031 B1 4/2005 Korsunsky et al.
6,899,566 B2 5/2005 Kline et al.
6,903,939 B1 6/2005 Chea, Jr. et al.
6,913,490 B2 7/2005 Whiteman, Jr. et al.
6,932,649 B1 8/2005 Rothermel et al.
6,957,967 B2 10/2005 Petersen et al.
6,960,103 B2 11/2005 Tokunaga
6,971,916 B2 12/2005 Tokunaga
6,979,202 B2 12/2005 Benham et al.
6,979,226 B2 12/2005 Otsu et al.
6,982,378 B2 1/2006 Dickson
7,004,793 B2 2/2006 Scherer et al.
7,021,969 B2 4/2006 Matsunaga
7,044,794 B2 5/2006 Consoli et al.
7,057,570 B2 6/2006 Irion, II et al.
7,074,086 B2 7/2006 Cohen et al.
7,094,102 B2 8/2006 Cohen et al.
7,108,556 B2 9/2006 Cohen et al.
7,120,327 B2 10/2006 Bozso et al.
7,137,849 B2 11/2006 Nagata
7,163,421 B1 1/2007 Cohen et al.
7,182,643 B2 2/2007 Winings et al.
7,229,318 B2 6/2007 Winings et al.
7,261,591 B2 8/2007 Korsunsky et al.
7,270,573 B2 9/2007 Houtz
7,285,018 B2 10/2007 Kenny et al.
7,303,427 B2 12/2007 Swain
7,309,239 B2 12/2007 Shuey et al.
7,316,585 B2 1/2008 Smith et al.
7,322,855 B2 * 1/2008 Mongold ........... H01R 13/6587
439/607.05
7,335,063 B2 2/2008 Cohen et al.
7,347,721 B2 3/2008 Kameyama
7,351,114 B2 4/2008 Benham et al.
7,365,269 B2 4/2008 Donazzi et al.
7,371,117 B2 5/2008 Gailus
7,390,218 B2 6/2008 Smith et al.
7,390,220 B1 6/2008 Wu
7,494,383 B2 2/2009 Cohen et al.
7,540,781 B2 6/2009 Kenny et al.
7,554,096 B2 6/2009 Ward et al.
7,581,990 B2 9/2009 Kirk et al.
7,585,186 B2 9/2009 McAlonis et al.
7,588,464 B2 9/2009 Kim
7,588,467 B2 9/2009 Chang
7,594,826 B2 9/2009 Kobayashi et al.
7,604,490 B2 10/2009 Chen et al.
7,674,133 B2 3/2010 Fogg et al.
7,699,663 B1 4/2010 Little et al.
7,722,401 B2 5/2010 Kirk et al.
7,731,537 B2 6/2010 Amleshi et al.
7,753,731 B2 7/2010 Cohen et al.
7,758,357 B2 7/2010 Pan et al.
7,771,233 B2 8/2010 Gailus
7,794,240 B2 9/2010 Cohen et al.
7,794,278 B2 9/2010 Cohen et al.
7,806,729 B2 10/2010 Nguyen et al.
7,828,595 B2 11/2010 Mathews
7,874,873 B2 1/2011 Do et al.
7,887,371 B2 2/2011 Kenny et al.
7,887,379 B2 2/2011 Kirk
7,906,730 B2 3/2011 Atkinson et al.
7,914,304 B2 3/2011 Cartier et al.
7,927,143 B2 4/2011 Helster et al.
7,985,097 B2 7/2011 Gulla
8,083,553 B2 12/2011 Manter et al.
8,182,289 B2 5/2012 Stokoe et al.
8,215,968 B2 7/2012 Cartier et al.
8,216,001 B2 7/2012 Kirk
8,267,721 B2 9/2012 Minich
8,272,877 B2 9/2012 Stokoe et al.
8,371,875 B2 2/2013 Gailus
8,382,524 B2 2/2013 Khilchenko et al.
8,657,627 B2 2/2014 McNamara et al.
8,715,003 B2 5/2014 Buck et al.
8,771,016 B2 7/2014 Atkinson et al.
8,864,521 B2 10/2014 Atkinson et al.
8,926,377 B2 1/2015 Kirk et al.
8,944,831 B2 2/2015 Stoner et al.
8,998,642 B2 4/2015 Manter et al.
9,004,942 B2 4/2015 Paniauqa
9,022,806 B2 5/2015 Cartier, Jr. et al.
9,028,201 B2 5/2015 Kirk et al.
9,028,281 B2 5/2015 Kirk et al.
9,065,230 B2 6/2015 Milbrand, Jr.
9,083,130 B2 7/2015 Casher et al.
9,124,009 B2 9/2015 Atkinson et al.
9,219,335 B2 12/2015 Atkinson et al.
9,225,085 B2 12/2015 Cartier, Jr. et al.
9,300,074 B2 3/2016 Gailus
9,450,344 B2 9/2016 Cartier, Jr. et al.
9,484,674 B2 11/2016 Cartier, Jr. et al.
9,705,255 B2 7/2017 Atkinson et al.
9,831,588 B2 11/2017 Cohen
9,899,774 B2 2/2018 Gailus
10,122,129 B2 11/2018 Milbrand, Jr. et al.
10,186,814 B2 1/2019 Khilchenko et al.
10,211,577 B2 2/2019 Milbrand, Jr. et al.
10,243,304 B2 3/2019 Kirk et al.
10,381,767 B1 8/2019 Milbrand, Jr. et al.
10,797,417 B2 10/2020 Scholeno et al.
12,057,660 B2 8/2024 Xu et al.
2001/0012730 A1 8/2001 Ramey et al.
2001/0041477 A1 11/2001 Billman et al.
2001/0042632 A1 11/2001 Manov et al.
2001/0046810 A1 11/2001 Cohen et al.
2002/0042223 A1 4/2002 Belopolsky et al.
2002/0086582 A1 7/2002 Nitta et al.
2002/0089464 A1 7/2002 Joshi
2002/0098738 A1 7/2002 Astbury et al.
2002/0102885 A1 8/2002 Kline
2002/0111068 A1 8/2002 Cohen et al.
2002/0111069 A1 8/2002 Astbury et al.
2002/0115335 A1 8/2002 Saito
2002/0123266 A1 9/2002 Ramey et al.
2002/0136506 A1 9/2002 Asada et al.
2002/0168898 A1 11/2002 Billman et al.
2002/0172469 A1 11/2002 Benner et al.
2002/0181215 A1 12/2002 Guenthner
2002/0192988 A1 12/2002 Droesbeke et al.
2003/0003803 A1 1/2003 Billman et al.
2003/0008561 A1 1/2003 Lappoehn
2003/0008562 A1 1/2003 Yamasaki
2003/0022555 A1 1/2003 Vicich et al.
2003/0027439 A1 2/2003 Johnescu et al.
2003/0109174 A1 6/2003 Korsunsky et al.
2003/0143894 A1 7/2003 Kline et al.
2003/0147227 A1 8/2003 Egitto et al.
2003/0220018 A1 11/2003 Winings et al.
2003/0220021 A1 11/2003 Whiteman et al.
2004/0001299 A1 1/2004 van Haaster et al.
2004/0005815 A1 1/2004 Mizumura et al.
2004/0020674 A1 2/2004 McFadden et al.
2004/0043661 A1 3/2004 Okada et al.
2004/0072473 A1 4/2004 Wu
2004/0097112 A1 5/2004 Minich et al.
2004/0115968 A1 6/2004 Cohen
2004/0121652 A1 6/2004 Gailus
2004/0171305 A1 9/2004 McGowan et al.
2004/0196112 A1 10/2004 Welbon et al.
2004/0224559 A1 11/2004 Nelson et al.
2004/0235352 A1 11/2004 Takemasa
2004/0259419 A1 12/2004 Payne et al.
2005/0006119 A1 1/2005 Cunningham et al.
2005/0020135 A1 1/2005 Whiteman et al.
2005/0039331 A1 2/2005 Smith

(56) References Cited

U.S. PATENT DOCUMENTS

| | | | |
|---|---|---|---|
| 2005/0048838 | A1 | 3/2005 | Korsunsky et al. |
| 2005/0048842 | A1 | 3/2005 | Benham et al. |
| 2005/0070160 | A1 | 3/2005 | Cohen et al. |
| 2005/0090299 | A1 | 4/2005 | Tsao et al. |
| 2005/0133245 | A1 | 6/2005 | Katsuyama et al. |
| 2005/0148239 | A1 | 7/2005 | Hull et al. |
| 2005/0176300 | A1 | 8/2005 | Hsu et al. |
| 2005/0176835 | A1 | 8/2005 | Kobayashi et al. |
| 2005/0215121 | A1 | 9/2005 | Tokunaga |
| 2005/0233610 | A1 | 10/2005 | Tutt et al. |
| 2005/0277315 | A1 | 12/2005 | Mongold et al. |
| 2005/0283974 | A1 | 12/2005 | Richard et al. |
| 2005/0287869 | A1 | 12/2005 | Kenny et al. |
| 2006/0009080 | A1 | 1/2006 | Regnier et al. |
| 2006/0019517 | A1 | 1/2006 | Raistrick et al. |
| 2006/0019538 | A1 | 1/2006 | Davis et al. |
| 2006/0024983 | A1 | 2/2006 | Cohen et al. |
| 2006/0024984 | A1 | 2/2006 | Cohen et al. |
| 2006/0068640 | A1 | 3/2006 | Gailus |
| 2006/0073709 | A1 | 4/2006 | Reid |
| 2006/0104010 | A1 | 5/2006 | Donazzi et al. |
| 2006/0141866 | A1 | 6/2006 | Shiu |
| 2006/0166551 | A1 | 7/2006 | Korsunsky et al. |
| 2006/0216969 | A1 | 9/2006 | Bright et al. |
| 2006/0255876 | A1 | 11/2006 | Kushta et al. |
| 2006/0292932 | A1 | 12/2006 | Benham et al. |
| 2007/0004282 | A1 | 1/2007 | Cohen et al. |
| 2007/0004828 | A1 | 1/2007 | Khabbaz |
| 2007/0021000 | A1 | 1/2007 | Laurx |
| 2007/0021001 | A1 | 1/2007 | Laurx et al. |
| 2007/0021002 | A1 | 1/2007 | Laurx et al. |
| 2007/0021003 | A1 | 1/2007 | Laurx et al. |
| 2007/0021004 | A1 | 1/2007 | Laurx et al. |
| 2007/0037419 | A1 | 2/2007 | Sparrowhawk |
| 2007/0042639 | A1 | 2/2007 | Manter et al. |
| 2007/0054554 | A1 | 3/2007 | Do et al. |
| 2007/0059961 | A1 | 3/2007 | Cartier et al. |
| 2007/0111597 | A1 | 5/2007 | Kondou et al. |
| 2007/0141872 | A1 | 6/2007 | Szczesny et al. |
| 2007/0218765 | A1 | 9/2007 | Cohen et al. |
| 2007/0275583 | A1 | 11/2007 | McNutt et al. |
| 2008/0050968 | A1 | 2/2008 | Chang |
| 2008/0194146 | A1 | 8/2008 | Gailus |
| 2008/0246555 | A1 | 10/2008 | Kirk et al. |
| 2008/0248658 | A1 | 10/2008 | Cohen et al. |
| 2008/0248659 | A1 | 10/2008 | Cohen et al. |
| 2008/0248660 | A1 | 10/2008 | Kirk et al. |
| 2008/0318455 | A1 | 12/2008 | Beaman et al. |
| 2009/0011641 | A1 | 1/2009 | Cohen et al. |
| 2009/0011643 | A1 | 1/2009 | Amleshi et al. |
| 2009/0011645 | A1 | 1/2009 | Laurx et al. |
| 2009/0029602 | A1 | 1/2009 | Cohen et al. |
| 2009/0035955 | A1 | 2/2009 | McNamara |
| 2009/0061661 | A1 | 3/2009 | Shuey et al. |
| 2009/0117386 | A1 | 5/2009 | Vacanti et al. |
| 2009/0149045 | A1 | 6/2009 | Chen et al. |
| 2009/0203259 | A1 | 8/2009 | Nguyen et al. |
| 2009/0239395 | A1 | 9/2009 | Cohen et al. |
| 2009/0258516 | A1 | 10/2009 | Hiew et al. |
| 2009/0291593 | A1 | 11/2009 | Atkinson et al. |
| 2009/0305533 | A1 | 12/2009 | Feldman et al. |
| 2010/0048058 | A1 | 2/2010 | Morgan et al. |
| 2010/0081302 | A1 | 4/2010 | Atkinson et al. |
| 2010/0099299 | A1 | 4/2010 | Moriyama et al. |
| 2010/0273359 | A1 | 10/2010 | Walker et al. |
| 2010/0294530 | A1 | 11/2010 | Atkinson et al. |
| 2011/0003509 | A1 | 1/2011 | Gailus |
| 2011/0067237 | A1 | 3/2011 | Cohen et al. |
| 2011/0104948 | A1 | 5/2011 | Girard, Jr. et al. |
| 2011/0212649 | A1 | 9/2011 | Stokoe et al. |
| 2011/0212650 | A1 | 9/2011 | Amleshi et al. |
| 2011/0230095 | A1 | 9/2011 | Atkinson et al. |
| 2011/0230096 | A1 | 9/2011 | Atkinson et al. |
| 2011/0256739 | A1 | 10/2011 | Toshiyuki et al. |
| 2011/0287663 | A1 | 11/2011 | Gailus et al. |
| 2012/0077380 | A1 | 3/2012 | Minich et al. |
| 2012/0094536 | A1 | 4/2012 | Khilchenko et al. |
| 2012/0156929 | A1 | 6/2012 | Manter et al. |
| 2012/0184154 | A1 | 7/2012 | Frank et al. |
| 2012/0202363 | A1* | 8/2012 | McNamara .......... H01R 13/516 439/74 |
| 2012/0202386 | A1 | 8/2012 | McNamara et al. |
| 2012/0214343 | A1 | 8/2012 | Buck et al. |
| 2012/0214344 | A1 | 8/2012 | Cohen et al. |
| 2013/0012038 | A1 | 1/2013 | Kirk et al. |
| 2013/0017733 | A1 | 1/2013 | Kirk et al. |
| 2013/0065454 | A1 | 3/2013 | Milbrand Jr. |
| 2013/0078870 | A1 | 3/2013 | Milbrand, Jr. |
| 2013/0109232 | A1 | 5/2013 | Paniaqua |
| 2013/0196553 | A1 | 8/2013 | Gailus |
| 2013/0217263 | A1 | 8/2013 | Pan |
| 2013/0225006 | A1 | 8/2013 | Khilchenko et al. |
| 2013/0273781 | A1 | 10/2013 | Buck et al. |
| 2013/0316590 | A1 | 11/2013 | Hon |
| 2014/0004724 | A1 | 1/2014 | Cartier, Jr. et al. |
| 2014/0004726 | A1 | 1/2014 | Cartier, Jr. et al. |
| 2014/0004746 | A1 | 1/2014 | Cartier, Jr. et al. |
| 2014/0057498 | A1 | 2/2014 | Cohen |
| 2014/0148022 | A1 | 5/2014 | Mongold et al. |
| 2014/0273557 | A1 | 9/2014 | Cartier, Jr. et al. |
| 2014/0273627 | A1 | 9/2014 | Cartier, Jr. et al. |
| 2015/0056856 | A1 | 2/2015 | Atkinson et al. |
| 2015/0111427 | A1 | 4/2015 | Wu et al. |
| 2015/0236451 | A1 | 8/2015 | Cartier, Jr. et al. |
| 2015/0236452 | A1 | 8/2015 | Cartier, Jr. et al. |
| 2015/0255926 | A1 | 9/2015 | Paniagua |
| 2016/0149343 | A1 | 5/2016 | Atkinson et al. |
| 2016/0211618 | A1 | 7/2016 | Gailus |
| 2018/0062323 | A1 | 3/2018 | Kirk et al. |
| 2018/0145438 | A1 | 5/2018 | Cohen |
| 2018/0166828 | A1 | 6/2018 | Gailus |
| 2018/0198220 | A1 | 7/2018 | Sasame et al. |
| 2018/0219331 | A1 | 8/2018 | Cartier, Jr. et al. |
| 2020/0021052 | A1 | 1/2020 | Milbrand, Jr. et al. |
| 2020/0076132 | A1 | 3/2020 | Yang et al. |
| 2020/0220289 | A1 | 7/2020 | Scholeno et al. |
| 2022/0368070 | A1 | 11/2022 | Li et al. |
| 2024/0039199 | A1 | 2/2024 | Li et al. |
| 2024/0136774 | A1 | 4/2024 | Li et al. |
| 2025/0062575 | A1 | 2/2025 | Li et al. |

FOREIGN PATENT DOCUMENTS

| | | | |
|---|---|---|---|
| CN | 101552410 | A | 10/2009 |
| CN | 101600293 | A | 12/2009 |
| CN | 201374433 | Y | 12/2009 |
| CN | 101790818 | A | 7/2010 |
| CN | 101120490 | B | 11/2010 |
| CN | 101124697 | B | 3/2011 |
| CN | 201846527 | U | 5/2011 |
| CN | 102239605 | A | 11/2011 |
| CN | 101600293 | B | 5/2012 |
| CN | 102598430 | A | 7/2012 |
| CN | 101258649 | B | 9/2012 |
| CN | 102176586 | B | 11/2012 |
| CN | 102986091 | A | 3/2013 |
| CN | 107069274 | A | 8/2017 |
| CN | 216488672 | U * | 5/2022 |
| EP | 2169770 | A2 | 3/2010 |
| EP | 2262061 | A1 | 12/2010 |
| EP | 2388867 | A2 | 11/2011 |
| EP | 1794845 | B1 | 3/2013 |
| JP | 2009-043717 | A | 2/2009 |
| JP | 2009-110956 | A | 5/2009 |
| KR | 10-2007-0033027 | A | 3/2007 |
| TW | 200926536 | A | 6/2009 |
| WO | WO 2009/111283 | A2 | 9/2009 |
| WO | WO 2010/030622 | A1 | 3/2010 |
| WO | WO 2010/039188 | A1 | 4/2010 |
| WO | WO 2011/060236 | A1 | 5/2011 |
| WO | WO 2011/100740 | A2 | 8/2011 |
| WO | WO 2011/106572 | A2 | 9/2011 |
| WO | WO 2011/139946 | A1 | 11/2011 |
| WO | WO 2011/140438 | A2 | 11/2011 |

(56) References Cited

FOREIGN PATENT DOCUMENTS

| | | | |
|---|---|---|---|
| WO | WO 2011/140438 | A3 | 12/2011 |
| WO | WO 2012/106554 | A2 | 8/2012 |
| WO | WO 2013/059317 | A1 | 4/2013 |
| WO | WO 2015/112717 | A1 | 7/2015 |
| WO | WO 2016/195849 | A1 | 12/2016 |
| WO | WO 2018/039164 | A1 | 3/2018 |

OTHER PUBLICATIONS

Chinese Supplemental Observations dated Jun. 17, 2021 in connection with Chinese Application No. 201210249710.9.
Chinese Invalidation Request dated Aug. 17, 2021 in connection with Chinese Application No. 200580040906.5.
Chinese Invalidation Request dated Sep. 9, 2021 in connection with Chinese Application No. 201110008089.2.
International Search Report and Written Opinion mailed Jan. 15, 2024 in connection with International Application No. PCT/US2023/033383.
Petition for Inter Partes Review. *Luxshare Precision Industry Co., Ltd* v. *Amphenol Corp*. U.S. Pat. No. 10,381,767. IPR2022-00132. Nov. 4, 2021. 112 pages.
Decision Invalidating CN Patent Application No. 201610952606.4 dated Sep. 18, 2021, which issued as CN Utility Model Patent No. 107069274B, and Certified Translation.
In re Certain Electrical Connectors and Cages, Components Thereof, and Prods. Containing the Same, Inv. No. 337-TA-1241, Order No. 31 (Oct. 19, 2021): Construing Certain Terms of the Asserted Claims of the Patents at Issue.
In re Matter of Certain Electrical Connectors and Cages, Components Thereof, and Products Containing the Same, Inv. No. 337-TA-1241, Luxshare Respondents' Initial Post-Hearing Brief. Public Version. Nov. 23, 2021. 348 pages.
In re Matter of Certain Electrical Connectors and Cages, Components Thereof, and Products Containing the Same, Inv. No. 337-TA-1241, Luxshare Respondents' Reply Post-Hearing Brief. Public Version. Dec. 6, 2021. 165 pages.
In re Matter of Certain Electrical Connectors and Cages, Components Thereof, and Products Containing the Same, Inv. No. 337-TA-1241, Complainant Amphenol Corporation's Corrected Initial Post-Hearing Brief. Public Version. Jan. 5, 2022. 451 pages.
In re Matter of Certain Electrical Connectors and Cages, Components Thereof, and Products Containing the Same, Inv. No. 337-TA-1241, Complainant Amphenol Corporation's Post-Hearing Reply Brief. Public Version. Dec. 6, 2021. 159 pages.
In re Matter of Certain Electrical Connectors and Cages, Components Thereof, and Products Containing the Same, Inv. No. 337-TA-1241, Notice of Prior Art. Jun. 3, 2021. 319 pages.
In re Matter of Certain Electrical Connectors and Cages, Components Thereof, and Products Containing the Same, Inv. No. 337-TA-1241, Respondents' Pre-Hearing Brief. Redacted. Oct. 21, 2021. 219 pages.
Invalidity Claim Charts Based on CN 201112782Y ("Cai"). Luxshare Respondents' Supplemental Responses to Interrogatories Nos. 13 and 14, Exhibit 25. May 7, 2021. 147 pages.
Invalidity Claim Charts Based on U.S. Pat. No. 6,179,651 ("Huang"). Luxshare Respondents' Supplemental Responses to Interrogatories Nos. 13 and 14, Exhibit 26. May 7, 2021. 153 pages.
Invalidity Claim Charts Based on U.S. Pat. No. 7,261,591 ("Korsunsky"). Luxshare Respondents' Supplemental Responses to Interrogatories Nos. 13 and 14, Exhibit 27. May 7, 2021. 150 pages.
In the Matter of Certain Electrical Connectors and Cages, Components Thereof, and Products Containing the Same, Inv. No. 337-TA-1241, Final Initial Determination on Violation of Section 337. Public Version. Mar. 11, 2022. 393 pages.
[No Author Listed], Cable Systems. Samtec. Aug. 2010. 148 pages.
[No Author Listed], Common Management Interface Specification. Rev 4.0. MSA Group. May 8, 2019. 265 pages.
[No Author Listed], Electronics Connector Overview. FCI. Sep. 23, 2009. 78 pages.
[No Author Listed], EMI Shielding Compounds Instead of Metal. RTP Company. Last Accessed Apr. 30, 2021. 2 pages.
[No Author Listed], EMI Shielding Solutions and EMC Testing Services from Laird Technologies. Laird Technologies. Last accessed Apr. 30, 2021. 1 page.
[No Author Listed], FCI—High Speed Interconnect Solutions, Backpanel Connectors. FCI. [last accessed Apr. 30, 2021). 2 pages.
[No Author Listed], HOZOX EMI Absorption Sheet and Tape. Molex. Laird Technologies. 2013. 2 pages.
[No Author Listed], OSFP MSA Specification for OSFP Octal Small Form Factor Pluggable Module. Revision 3.0 OSFP MSA. Mar. 14, 2020. 99 pages.
[No Author Listed], Photograph of Molex Connector. Oct. 2021. 1 page.
[No Author Listed], Photograph of TE Connector. Oct. 2021. 1 page.
[No Author Listed], Pluggable Input/Output Solutions. Tyco Electronics Catalog 1773408-1. Revised Feb. 2009. 40 pages.
[No Author Listed], QSFP-DD MSA QSFP-DD Hardware Specification for QSFP Double Density 8X Pluggable Transceiver. Revision 5.1. QSFP-DD MSA. Aug. 7, 2020. 84 pages.
[No Author Listed], QSFP-DD Specification for QSFP Double Density 8X Pluggable Transceiver Specification, Rev. 2.0. QSFP-DD MSA. Mar. 13, 2017. 106 pages.
[No Author Listed], RTP Company-EMI/RFI Shielding Compounds (Conductive) Data Sheets. RTP Company. Last accessed Apr. 30, 2021. 4 pages.
[No Author Listed], SFF Committee SFF-8436 Specification for QSFP+ 4X 10 Gb/s Pluggable Transceiver. Revision 4.9. SFF Committee. Aug. 31, 2018. 88 pages.
[No Author Listed], SFF Committee SFF-8665 Specification for QSFP+ 28 GB/s 4X Pluggable Transceiver Solution (QSFP28). Revision 1.9. SFF Committee. Jun. 29, 2015. 14 pages.
[No Author Listed], SFF-8431 Specifications for Enhanced Small Form Factor Pluggable Module SFP+. Revision 4.1. SFF Committee. Jul. 6, 2009. 132 pages.
[No Author Listed], SFF-8432 Specification for SFP+ Module and Cage. Rev 5.1. SFF Committee. Aug. 8, 2012. 18 pages.
[No Author Listed], SFF-8433 Specification for SFP+ Ganged Cage Footprints and Bezel Openings. Rev 0.7. SFF Committee. Jun. 5, 2009. 15 pages.
[No Author Listed], SFF-8477 Specification for Tunable XFP for ITU Frequency Grid Applications. Rev 1.4. SFF Committee. Dec. 4, 2009. 13 pages.
[No Author Listed], SFF-8672 Specification for QSFP+ 4x 28 GB/s Connector (Style B). Revision 1.2. SNIA. Jun. 8, 2018. 21 pages.
[No Author Listed], SFF-8679 Specification for QSFP+ 4X Base Electrical Specification. Rev 1.7. SFF Committee. Aug. 12, 2014. 31 pages.
[No Author Listed], SFF-8682 Specification for QSFP+ 4X Connector. Rev 1.1. SNIA SFF TWG Technology Affiliate. Jun. 8, 2018. 19 pages.
[No Author Listed], Shielding Theory and Design. Laird Technologies. Last accessed Apr. 30, 2021. 1 page.
[No Author Listed], Shielding Theory and Design. Laird Technologies. Last accessed Apr. 30, 2021. 2 pages. URL:web.archive.org/web/20030226182710/http://www.lairdtech.com/catalog/staticdata/shieldingtheorydesign/std_3.htm.
[No Author Listed], Shielding Theory and Design. Laird Technologies. Last accessed Apr. 30, 2021. 2 pages. URL:web.archive.org/web/20021223144443/http://www.lairdtech.com/catalog/staticdata/shieldingtheorydesign/std_2.htm.
[No Author Listed], Typical conductive additives—Conductive Compounds. RTP Company. https://www.rtpcompany.com/products/conductive/additives.htm. Last accessed Apr. 30, 2021. 2 pages.
[No Author Listed], Z-Pack HM-Zd Connector, High Speed Backplane Connectors. Tyco Electronics. Catalog 1773095. 2009;5-44.
Atkinson et al., High Frequency Electrical Connector, U.S. Appl. No. 15/645,931, filed Jul. 10, 2017.
Do et al., A Novel Concept Utilizing Conductive Polymers on Power Connectors During Hot Swapping in Live Modular Electronic Systems. IEEE Xplore 2005; downloaded Feb. 18, 2021;340-345.

(56) References Cited

OTHER PUBLICATIONS

McAlexander, CV of Joseph C. McAlexander III . Exhibit 1009. 2021. 31 pages.
McAlexander, Declaration of Joseph C. McAlexander III in Support of Petition for Inter Partes Review of U.S. Pat. No. 10,381,767. Exhibit 1002. Nov. 4, 2021. 85 pages.
Silva et al., Conducting Materials Based on Epoxy/Graphene Nanoplatelet Composites With Microwave Absorbing Properties: Effect of the Processing Conditions and Ionic Liquid. Frontiers in Materials. Jul. 2019;6(156):1-9. doi: 10.3389/fmats.2019.00156.
Tracy, Rev. 3.0 Specification IP (Intellectual Property). Mar. 20, 2020. 8 pages.

* cited by examiner

HIGH PERFORMANCE MEZZANINE CONNECTOR WITH LOW STACK HEIGHT

CROSS-REFERENCE TO RELATED APPLICATIONS

This application claims priority to and the benefit of U.S. Provisional Application Ser. No. 63/409,407, filed on Sep. 23, 2022, entitled "HIGH PERFORMANCE MEZZANINE CONNECTOR WITH LOW STACK HEIGHT." The contents of this application are incorporated herein by reference in their entirety.

TECHNICAL FIELD

This patent application relates generally to mezzanine connectors, such as may be used to connect parallel printed circuit boards.

BACKGROUND

Separable electrical connectors are used in many electronic systems to connect subassemblies. Integrating subassemblies into a device using electrical connectors can be simply accomplished by pressing the subassemblies together such that the separable connectors mate. Manufacturing an electronic system in this way can provide multiple benefits. Each subassembly may be manufactured by a company that specializes in the functionality provided by that subassembly, such that the subassemblies might deliver higher performance or quality than comparable electronic circuitry of a full device manufactured by a single company. Further, subassemblies enable the device to be maintained over its lifetime, as subassemblies may be added or replaced to repair or upgrade the electronic system.

A server, for example, may be assembled from two or more subassemblies. Each electronic subassembly may be formed by attaching components to a printed circuit board. One subassembly may be the server motherboard. The motherboard may be a printed circuit board that makes connections between components, such as a processor, memory, power, and a network interface, that operate together to provide the server functionality. Some of the components may be mounted to the motherboard, but others may be mounted to other printed circuit boards, often called daughter cards. The daughtercard subassemblies may be connected to the motherboard through separable connectors.

Connectors are configured to mount to printed circuit boards (PCBs) with a desired orientation within a device. The daughter cards may be mounted, for example, with edges facing edges of the motherboard. A connector configured for mounting of subassemblies in this configuration may be configured as a right angle or an orthogonal connector. Alternatively, a daughtercard may be mounted with its surface parallel to the surface of the motherboard. Mezzanine connectors are configured for connecting parallel boards in this configuration. In a server, for example, a processor may be attached to a daughter card and attached to a motherboard through a mezzanine connector.

As electronic systems have gotten smaller, faster, and more complex, the number of circuits in a given area of an electronic system, along with the frequencies at which the circuits operate, have increased significantly in recent years. Current systems pass more data between PCBs and require electrical connectors that are electrically capable of handling more data at higher speeds than connectors of even a few years ago. The integrity of signals passing through a separable connector, however, is often negatively impacted with greater densities and higher frequencies such that it can be challenging to design a connector for both high-speed signals and high densities.

Miniaturization may provide a further design challenge for mezzanine connectors. A mezzanine connector must be sized to provide a specific stack height, defined by the spacing between parallel printed circuit boards connected through a mezzanine connector. In some systems, miniaturization is achieved by reducing the stack height, creating challenges for the design of the mezzanine connector. Shortening the length of the contacts, for example, may provide insufficient wipe between mating contacts and dimensional changes can sometimes undesirably impact the integrity of high-speed signals passing through the connector. As a result of these challenges, high-performance mezzanine connectors with stack heights below about 5 mm are not readily available.

SUMMARY

Concepts as described herein may be embodied as a low-profile mezzanine connector. The connector may comprise a housing comprising insulative material in an insulative portion and lossy material in a lossy portion, the housing comprising a plurality of slots disposed in a plurality of columns wherein the lossy portion comprises a plurality of projections adjacent to a subset of the slots in each of the plurality of columns; and a plurality of contacts, each comprising a portion in a respective slot of the plurality of slots.

In another aspect, a low-profile mezzanine connector may comprise a housing comprising insulative material in an insulative portion and lossy material in a lossy portion; and a plurality of contacts disposed in a plurality of columns. The housing may comprise a base having a first side and a second side, opposite the first side and a plurality of walls extending from the first side of the base. The plurality of contacts may each comprise a mating portion, a mounting portion and an intermediate portion joining the mating portion and the mounting portion. For each of the plurality of contacts the intermediate portion may be disposed in the base. The mating portion may extend from the base adjacent a wall of the plurality of walls. The base may comprise a plurality of first type regions in which the insulative material extends partially from the first side to the second side and the lossy material extends partially from the first side to the second side and a plurality of second type regions, interspersed with the plurality of first type regions, in which the insulative material extends fully from the first side to the second side.

In another aspect, a low-profile mezzanine connector may comprise a housing comprising a base having a first side and a second side, opposite the first side, and a plurality of insulative walls extending from the first side of the base and a plurality of contacts disposed in a plurality of columns. The plurality of contacts may each comprise a mating portion, a mounting portion and an intermediate portion joining the mating portion and the mounting portion. For each of the plurality of contacts, the intermediate portion may be disposed in the base; the mating portion extends from the base adjacent a wall of the plurality of walls; and for at least a subset of the plurality of contacts, a portion of a wall of the plurality of walls adjacent to the contact is tapered adjacent the base, whereby the impedance of the contacts in the subset is lowered.

These techniques may be used alone or in any suitable combination. The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have recognized and appreciated techniques for providing high-speed and high-density mezzanine connectors with low stack height. These techniques, for example, may suppress resonances with low insertion loss for signals, provide uniform impedance for signal paths matching the impedance of a printed circuit board to which the connector is mounted, enable use of short contacts, or enable reliable assembly of the connector. These techniques may be used separately or in combinations of one or more such techniques and may enable mezzanine connectors with stack heights of 5 mm or below, such as less than 4 mm or between 2.0 mm and 4.0 mm, in some examples. Such a low stack height connector may reliably pass signals carrying data at a rate of 56 Gbps or greater.

Figure 1A:
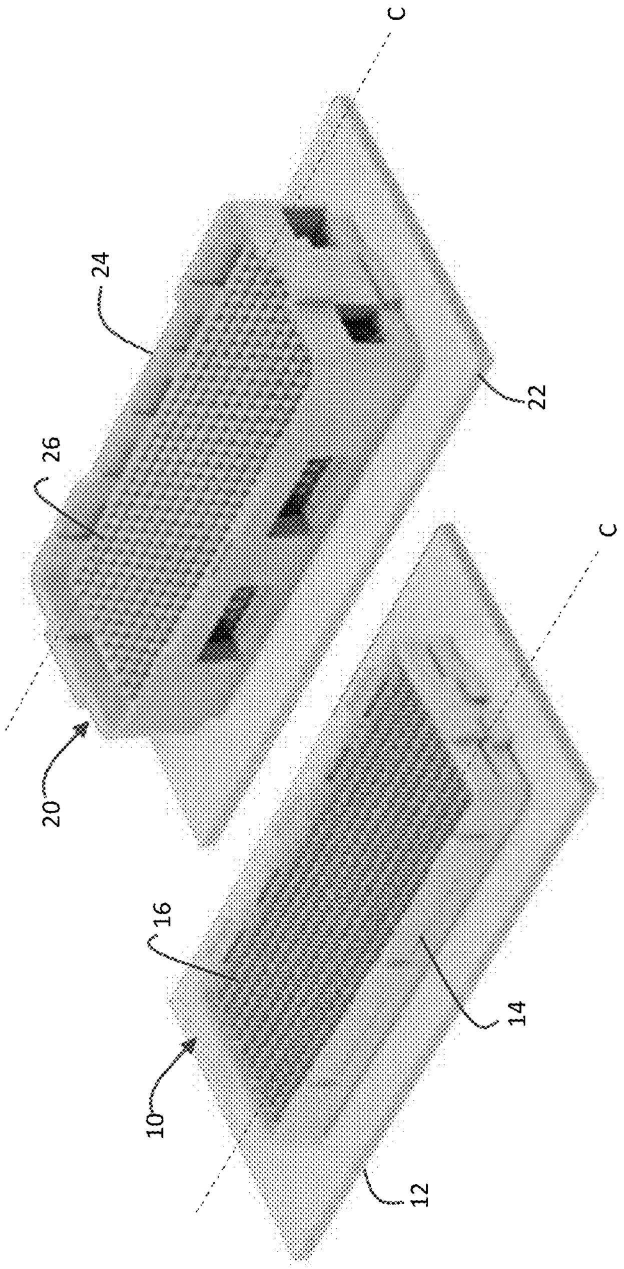
FIG. 1A (prior art)
FIG. 1A is a perspective view of mating connectors configured as BGA mezzanine connectors.
Figure 1B:
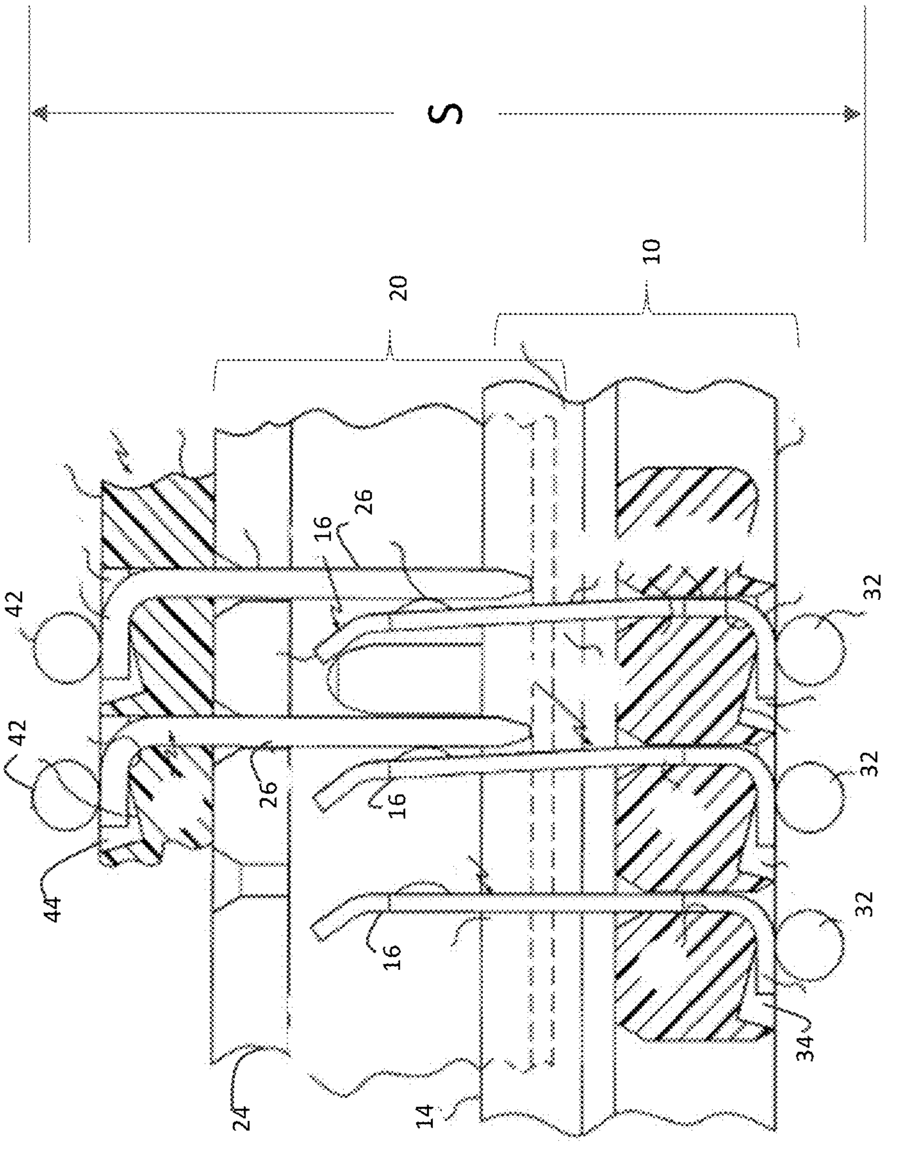
FIG. 1B (prior art)
FIG. 1B is a partial cross section through the connectors of FIG. 1A in a mated configuration.

FIGS. 1A and 1B illustrate known mezzanine connectors 10 and 20 mounted to respective PCBs using a BGA attachment technique. In the example of FIG. 1A, connector 10 is mounted to PCB 12 and connector 20 is mounted to PCB 22. Each of the connectors has a housing, which may be made of insulative material. Connector 10 has a housing 14 and connector 20 has a housing 24. In this example, housing 14 is configured to fit within and latch to housing 24, such that connectors 10 and 20 may be pressed together for mating. When mated, connectors 10 and 20 may collectively provide multiple conductive paths between PCB 12 and PCB 22.

Each of the housings 14 and 24 may hold multiple conductive contacts 16 and 26 that make connections through the respective connectors 10 and 20. Each of the contacts 16 and 26 may have a mating contact portion. The mating contact portions of contacts 16 and 26 may be complementary, such that when connectors 10 and 20 mate, a mating contact portion of a contact 16 may make electrical connection to a mating contact portion of a respective contact 26. For example, the meeting contact portions of contact 26 may be shaped as blades, and the mating contact portions of contacts 16 may be shaped as beams. Upon mating, the beams of contacts 16 may deflect, exerting a mating force against the blades of the mating contact portions of contacts 26.

The mating contact portions of the contacts are positioned at the mating interface of each of the connectors. As shown in FIG. 1A, the contacts 16 and 26 are arranged in multiple parallel columns C, such that the mating interface of each connector comprises an array with multiple parallel columns of mating contact portions.

Each of the contacts may have a tail configured for connecting the contact to another structure, which is the PCB in this example. The tails may extend from a respective housing at the mounting interface of the connector. In this example, as shown in the partial cross-section of FIG. 1B, the tails of the contacts 16 of connector 10 extend into pockets 34, formed at the mounting side of housing 14. Tails of contacts 26 of connector 20 extend into pockets 44 at the mounting side of housing 24. Each of the contacts 16 in connector 10 has a tail to which a solder ball 32 has been fused. Each of the contacts 26 in connector 20 has a tail to which a solder ball 42 has been fused. In the example of FIG. 1B, the tails of the contacts are bent such that a surface of the tail is parallel to the mounting interface and the solder balls 32 and 42 are fused to such a surface of the tail of a respective contact.

A connector, such as connectors 10 or 20 shown in FIGS. 1A and 1B, may be manufactured by molding a housing as a unitary structure with openings into which contacts are inserted. Alternatively, a housing may be formed of multiple components. A connector may be formed, for example, by first forming contact subassemblies, each of which has multiple contacts held in an insulative portion, which serves as a portion of the connector housing. These contact subassemblies may then be secured to a support structure such that the contact subassemblies are held together as a connector. As an example, an insulative frame may be molded with features (such as a slot) that receives ends of the contact subassemblies such that when the contact subassemblies are engaged in the frame, the contacts of the contact subassemblies form multiple parallel columns of contacts. Alternatively or additionally, the contact subassemblies may be held together by a metal clip or adhered to each other such as via an adhesive or heat staking.

In use, these solder balls 32 and 42 may be fused, in a reflow process, to pads on surfaces of parallel printed circuit boards. These boards may be separated by a distance S dictated by the height of the mated connectors. The distance S is sometimes referred to as the stack height for the connector. For some systems, it would be desirable to have a stack height of 5 mm or less than 5 mm, or 4 mm or less in some examples, such as between 2 mm and 4.5 mm for dense connectors that provide connections for 15 to 20 differential pairs per $cm^2$, such as at least 18 differential pairs, and may operate at data rates above 56 Gbps.

Figure 2B:
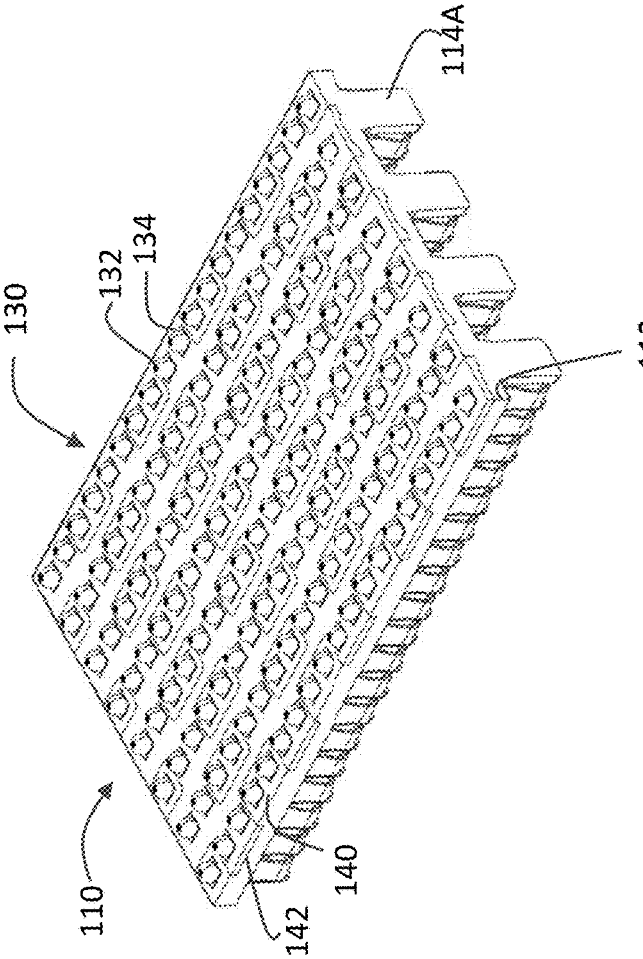
FIG. 2B is a bottom, perspective view of the exemplary mezzanine connector of FIG. 2A.
Figure 2A:
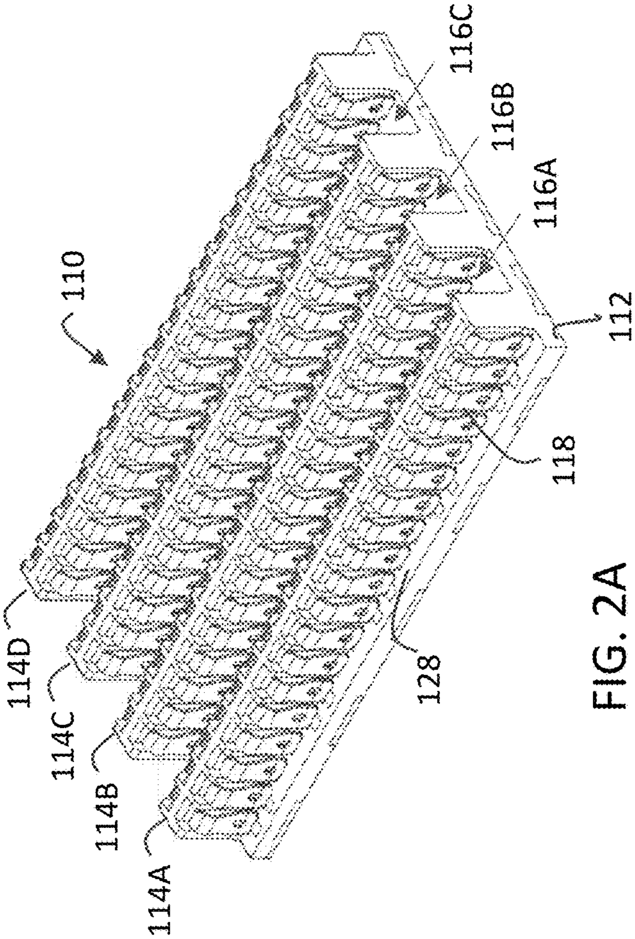
FIG. 2A is a top, perspective view of an exemplary mezzanine connector.

FIG. 2A illustrates a mezzanine connector 110 that may meet these requirements. FIG. 2A illustrates a field of contacts in an array with a plurality of columns. For simplicity, connector 110 is illustrated without perimeter walls, guidance or alignment features, and latching structures. It should be appreciated that these and other similar features could be incorporated. Further, it should be appreciated that the structure illustrated in FIG. 2A may be the full field of contacts in the connector or may be a subassembly that is integrated with a support structure to form a full connector.

Connector 110 has a housing that has a base 112 and a plurality of walls 114A . . . 114D. In this example, the base 112 is generally planar and walls 114A . . . 114D extend perpendicularly from an upper surface 128 of base 112. A plurality of contacts 118 are held in the base 112 of the housing. In this example, the contacts 118 are held in a plurality of columns, with each column adjacent to and parallel to a surface of a wall 114A . . . 114D. In this example, the contacts within each column are spaced, center to center, on a uniform pitch. The center-to-center pitch along a column may be in the range of 0.8 mm to 1.2 mm, such as 1 mm. The column-to-column pitch may be in the range of 1 to 2 mm, such as 1.5 mm.

FIG. 2A is a top view of connector 110. The mating interface of connector 110 is visible in the view of FIG. 2A. In the illustrated example, connector 110 includes contacts shaped and positioned to mate with a second connector that has similar contacts similarly shaped and positioned. To support such mating, walls 114A . . . 114D are separated by gaps 116A . . . 116C. A second mating connector may have a similar configuration, and when the connectors are mated, each of the walls 114A . . . 114D of the second connector will fit within a respective gap 116A . . . 116C of the first connector, and vice versa. In this state, the contacts 118 of the first connector will align with and press against the contacts 118 of the second connector. The contacts 118 in both of the connectors may deflect, generating a mating force normal to the surface of each of the mating contacts. Designs as described herein may support generation of normal force on the order of 50 grams per mated contact, nominal, with stability over the lifetime of the connector, such that the contact force is on the order of 30 grams after 1,000 hours at 105° C.

Though not illustrated in FIG. 2A, along each side, one of the connectors may have contacts disposed along an inwardly facing surface of a wall without contacts on the outwardly facing surface of the walls. Such a configuration may be used to ensure that there is not a column of contacts in one connector that does not align with and mate with a column of contacts in another column.

FIG. 2B illustrates a lower surface 130 of base 112. An array of solder balls 132 is distributed across the surface 130. Each of the contacts 118 may have a mounting portion to which a solder ball 132 is fused. Accordingly, the solder balls may have the same center-to-center spacing along each column and the same column-to-column spacing as the contacts 118. The solder balls may have a diameter in the range of 20 to 24 mils, such as 22 mils.

Each of the solder balls may partially sit within a pocket 134 in surface 130. The mounting portion of a contact 118 may extend into a respective pocket 134 where the solder ball 132 may be fused to the mounting portion.

The housing of connector 110 may be molded from one or more types of material. In this example, connector 110 has an insulative portion 140, formed of insulative material, and a lossy portion 142, formed of lossy material. In this example, the insulative portion includes islands (e.g. 510A and 510B, FIG. 5) within the base and walls 114A . . . 114D. The insulative material, for example, may be nylon or liquid crystal polymer (LCP), and may be filled with insulative fibers, such as glass fibers. The insulative material may be molded into the desired shape using injection molding to form insulative portion 140. The lossy portion 142 may be formed separately and inserted into insulative portion 140 or, as is illustrated in this example, injected as a second shot of material in a two-shot molding operation.

Materials that dissipate a sufficient portion of the electromagnetic energy interacting with that material to appreciably impact the performance of a connector may be regarded as lossy. A meaningful impact results from attenuation over a frequency range of interest for a connector. In some configurations, lossy material may suppress resonances within ground structures of the connector and the frequency range of interest may include the natural frequency of the resonant structure, without the lossy material in place. In other configurations, the frequency range of interest may be all or part of the operating frequency range of the connector.

For testing whether a material is lossy, the material may be tested over a frequency range that may be smaller than or different from the frequency range of interest of the connector in which the material is used. For example, the test frequency range may extend from 10 GHz to 25 GHz or 1 GHz to 5 GHz. Alternatively, lossy material may be identified from measurements made at a single frequency, such as 10 GHz or 15 GHz.

Loss may result from interaction of an electric field component of electromagnetic energy with the material, in which case the material may be termed electrically lossy. Alternatively or additionally, loss may result from interaction of a magnetic field component of the electromagnetic energy with the material, in which case the material may be termed magnetically lossy.

Electrically lossy materials can be formed from lossy dielectric and/or poorly conductive materials. Electrically lossy material can be formed from material traditionally regarded as dielectric materials, such as those that have an electric loss tangent greater than approximately 0.01, greater than 0.05, or between 0.01 and 0.2 in the frequency range of interest. The "electric loss tangent" is the ratio of the imaginary part to the real part of the complex electrical permittivity of the material.

Electrically lossy materials can also be formed from materials that are generally thought of as conductors but are relatively poor conductors over the frequency range of interest. These materials may conduct, but with some loss, over the frequency range of interest such that the material conducts more poorly than a conductor of an electrical connector, but better than an insulator used in the connector. Such materials may contain conductive particles or regions that are sufficiently dispersed that they do not provide high conductivity or otherwise are prepared with properties that lead to a relatively weak bulk conductivity compared to a good conductor such as pure copper over the frequency range of interest. Die cast metals or poorly conductive metal alloys, for example, may provide sufficient loss in some configurations.

Electrically lossy materials of this type typically have a bulk conductivity of about 1 Siemen/meter to about 100,000 Siemens/meter, or about 1 Siemen/meter to about 30,000

Siemens/meter, or 1 Siemen/meter to about 10,000 Siemens/meter. In some embodiments, material with a bulk conductivity of between about 1 Siemens/meter and about 500 Siemens/meter may be used. As a specific example, material with a conductivity between about 50 Siemens/meter and 300 Siemens/meter may be used. However, it should be appreciated that the conductivity of the material may be selected empirically or through electrical simulation using known simulation tools to determine a conductivity that provides suitable signal integrity (SI) characteristics in a connector. The measured or simulated SI characteristics may be, for example, low cross talk in combination with a low signal path attenuation or insertion loss, or a low insertion loss deviation as a function of frequency.

It should also be appreciated that a lossy member need not have uniform properties over its entire volume. A lossy member, for example, may have an insulative skin or a conductive core, for example. A member may be identified as lossy if its properties on average in the regions that interact with electromagnetic energy sufficiently attenuate the electromagnetic energy.

In some embodiments, lossy material is formed by adding to a binder a filler that contains particles. In such an embodiment, a lossy member may be formed by molding or otherwise shaping the binder with filler into a desired form. The lossy material may be molded over and/or through openings in conductors, which may be ground conductors or shields of the connector. Molding lossy material over or through openings in a conductor may ensure intimate contact between the lossy material and the conductor, which may reduce the possibility that the conductor will support a resonance at a frequency of interest. This intimate contact may, but need not, result in an Ohmic contact between the lossy material and the conductor.

Alternatively or additionally, the lossy material may be molded over or injected into insulative material, or vice versa, such as in a two-shot molding operation. The lossy material may press against or be positioned sufficiently near a ground conductor that there is appreciable coupling to a ground conductor. Intimate contact is not a requirement for electrical coupling between lossy material and a conductor, as sufficient electrical coupling, such as capacitive coupling, between a lossy member and a conductor may yield the desired result. For example, in some scenarios, 100 pF of coupling between a lossy member and a ground conductor may provide an appreciable impact on the suppression of resonance in the ground conductor. In other examples with frequencies in the range of approximately 10 GHz or higher, a reduction in the amount of electromagnetic energy in a conductor may be provided by sufficient capacitive coupling between a lossy material and the conductor with a mutual capacitance of at least about 0.005 pF, such as in a range between about 0.01 pF to about 100 pF, between about 0.01 pF to about 10 pF, or between about 0.01 pF to about 1 pF. To determine whether lossy material is coupled to a conductor, coupling may be measured at a test frequency, such as 15 GHz or over a test range, such as 10 GHz to 25 GHz.

To form an electrically lossy material, the filler may be conductive particles. Examples of conductive particles that may be used as a filler to form an electrically lossy material include carbon or graphite formed as fibers, flakes, nanoparticles, or other types of particles. Various forms of fiber, in woven or non-woven form, coated or non-coated may be used. Non-woven carbon fiber is one suitable material. Metal in the form of powder, flakes, fibers or other particles may also be used to provide suitable electrically lossy properties. Alternatively, combinations of fillers may be used. For example, metal plated carbon particles may be used. Silver and nickel are suitable metal plating for fibers. Coated particles may be used alone or in combination with other fillers, such as carbon flake.

Preferably, the fillers will be present in a sufficient volume percentage to allow conducting paths to be created from particle to particle. For example, when metal fiber is used, the fiber may be present in about 3% to 30% by volume. The amount of filler may impact the conducting properties of the material, and the volume percentage of filler may be lower in this range to provide sufficient loss.

The binder or matrix may be any material that will set, cure, or can otherwise be used to position the filler material. In some embodiments, the binder may be a thermoplastic material traditionally used in the manufacture of electrical connectors to facilitate the molding of the electrically lossy material into the desired shapes and locations as part of the manufacture of the electrical connector. Examples of such materials include liquid crystal polymer (LCP) and nylon. However, many alternative forms of binder materials may be used. Curable materials, such as epoxies, may serve as a binder. Alternatively, materials such as thermosetting resins or adhesives may be used.

While the above-described binder materials may be used to create an electrically lossy material by forming a binder around conducting particle fillers, lossy materials may be formed with other binders or in other ways. In some examples, conducting particles may be impregnated into a formed matrix material or may be coated onto a formed matrix material, such as by applying a conductive coating to a plastic component or a metal component. As used herein, the term "binder" encompasses a material that encapsulates the filler, is impregnated with the filler or otherwise serves as a substrate to hold the filler.

Magnetically lossy material can be formed, for example, from materials traditionally regarded as ferromagnetic materials, such as those that have a magnetic loss tangent greater than approximately 0.05 in the frequency range of interest. The "magnetic loss tangent" is the ratio of the imaginary part to the real part of the complex electrical permeability of the material. Materials with higher loss tangents may also be used.

In some embodiments, a magnetically lossy material may be formed of a binder or matrix material filled with particles that provide that layer with magnetically lossy characteristics. The magnetically lossy particles may be in any convenient form, such as flakes or fibers. Ferrites are common magnetically lossy materials. Materials such as magnesium ferrite, nickel ferrite, lithium ferrite, yttrium garnet or aluminum garnet may be used. Ferrites will generally have a loss tangent above 0.1 at the frequency range of interest. Presently preferred ferrite materials have a loss tangent between approximately 0.1 and 1.0 over the frequency range of 1 GHz to 3 GHz and more preferably a magnetic loss tangent above 0.5 over that frequency range.

Practical magnetically lossy materials or mixtures containing magnetically lossy materials may also exhibit useful amounts of dielectric loss or conductive loss effects over portions of the frequency range of interest. Suitable materials may be formed by adding fillers that produce magnetic loss to a binder, similar to the way that electrically lossy materials may be formed, as described above.

It is possible that a material may simultaneously be a lossy dielectric or a lossy conductor and a magnetically lossy material. Such materials may be formed, for example, by using magnetically lossy fillers that are partially conductive or by using a combination of magnetically lossy and electrically lossy fillers.

Lossy portions also may be formed in a number of ways. In some examples the binder material, with fillers, may be molded into a desired shape and then set in that shape. In other examples the binder material may be formed into a sheet or other shape, from which a lossy member of a desired shape may be cut. In some embodiments, a lossy portion may be formed by interleaving layers of lossy and conductive material such as metal foil. These layers may be rigidly attached to one another, such as through the use of epoxy or other adhesive, or may be held together in any other suitable way. The layers may be of the desired shape before being secured to one another or may be stamped or otherwise shaped after they are held together. As a further alternative, lossy portions may be formed by plating plastic or other insulative material with a lossy coating, such as a diffuse metal coating.

Figure 3:
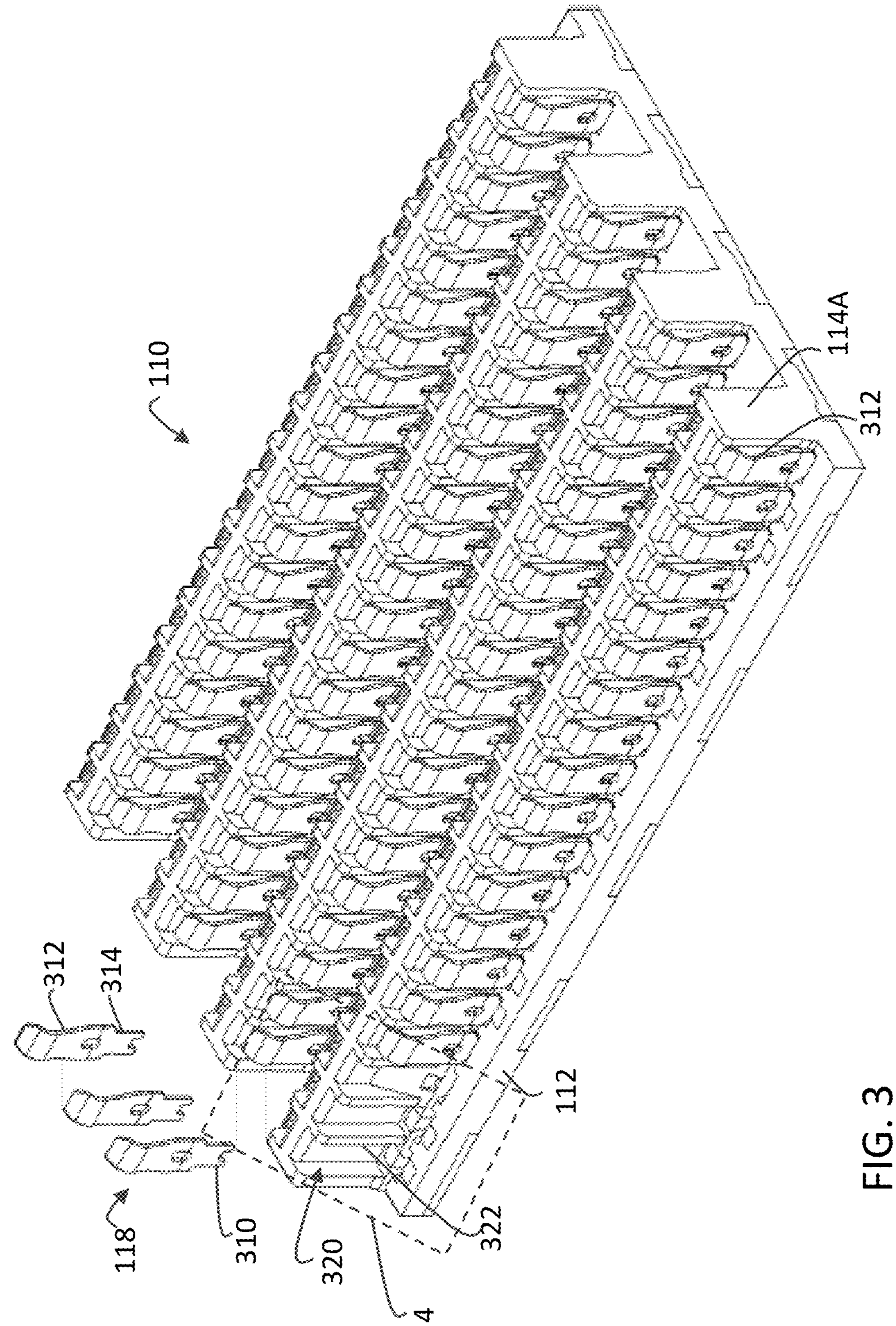
FIG. 3 is a partially exploded perspective view of the exemplary mezzanine connector of FIG. 2A.

FIG. 3 shows more details of connector 110. In this view, three of the contacts 118 are shown exploded from the housing, revealing structures of the housing within region 4 where those contacts are held adjacent an outer surface of wall 114A. Region 4 may be representative of locations at which other contacts in the same column are mounted against the outer surface of wall 114A. Other contacts in other columns may be similarly held in the housing adjacent the inner surface of wall 114A or adjacent the surface of any of the other walls.

In the example of FIG. 3, all of the contacts 118 are stamped from a sheet of metal and formed into the same shape. Contact 118 in this example has a mounting portion 310, a mating portion 312, and an intermediate portion 314, joining the mating portion and the mounting portion. Each of the contacts 118 may be formed of conductive and spring material, such as phosphor bronze or other copper alloy.

Each of the contacts 118, when held within the housing, aligns with a region 320 of the connector housing. In this example, the regions are bounded by ribs 322 formed in the outer surface of wall 114A. Though each of the contacts 118 has the same shape, the contacts may be functionally differentiated based on the configuration of the housing within the region 320 where the contact is held by the housing.

Figure 4:
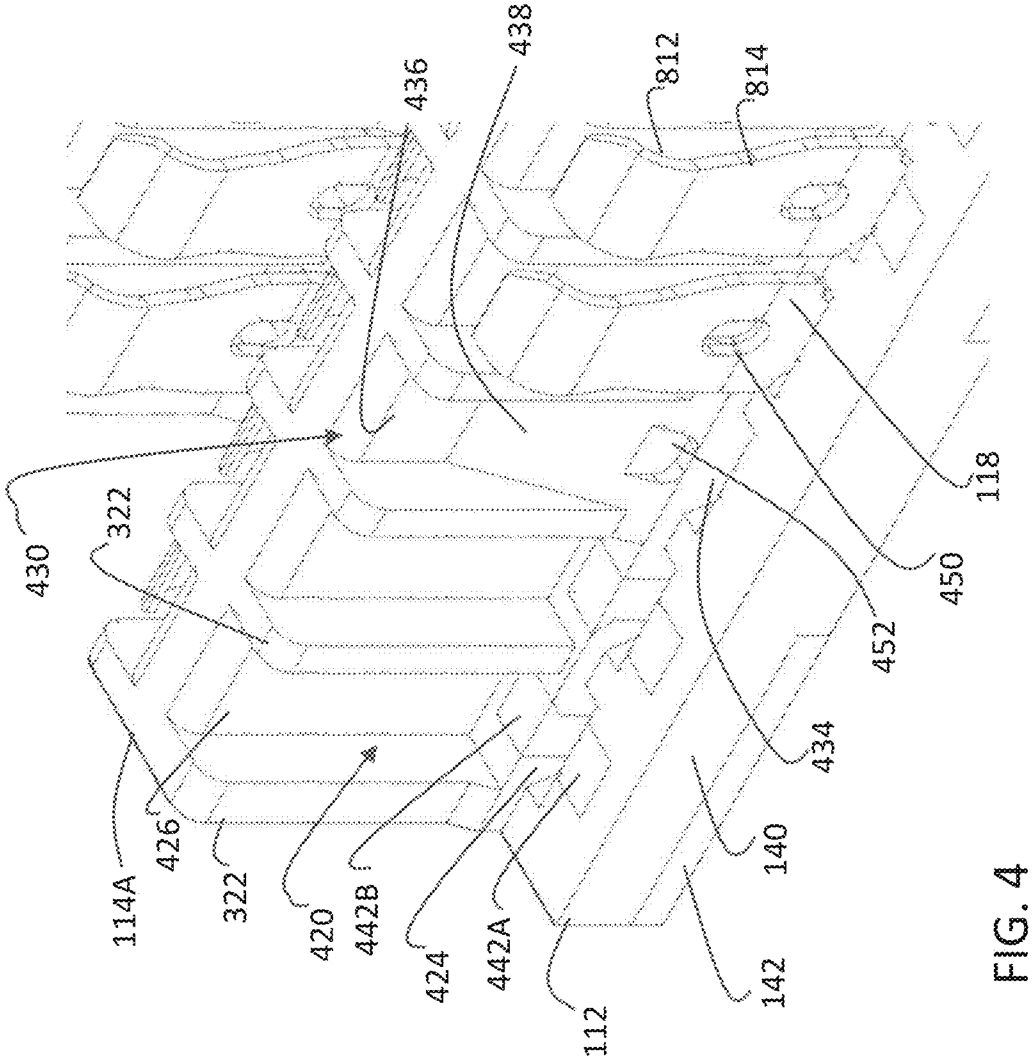
FIG. 4 is an enlarged view of the portion of the exemplary mezzanine connector of FIG. 2A within box 4 in FIG. 3.
Figure 5:
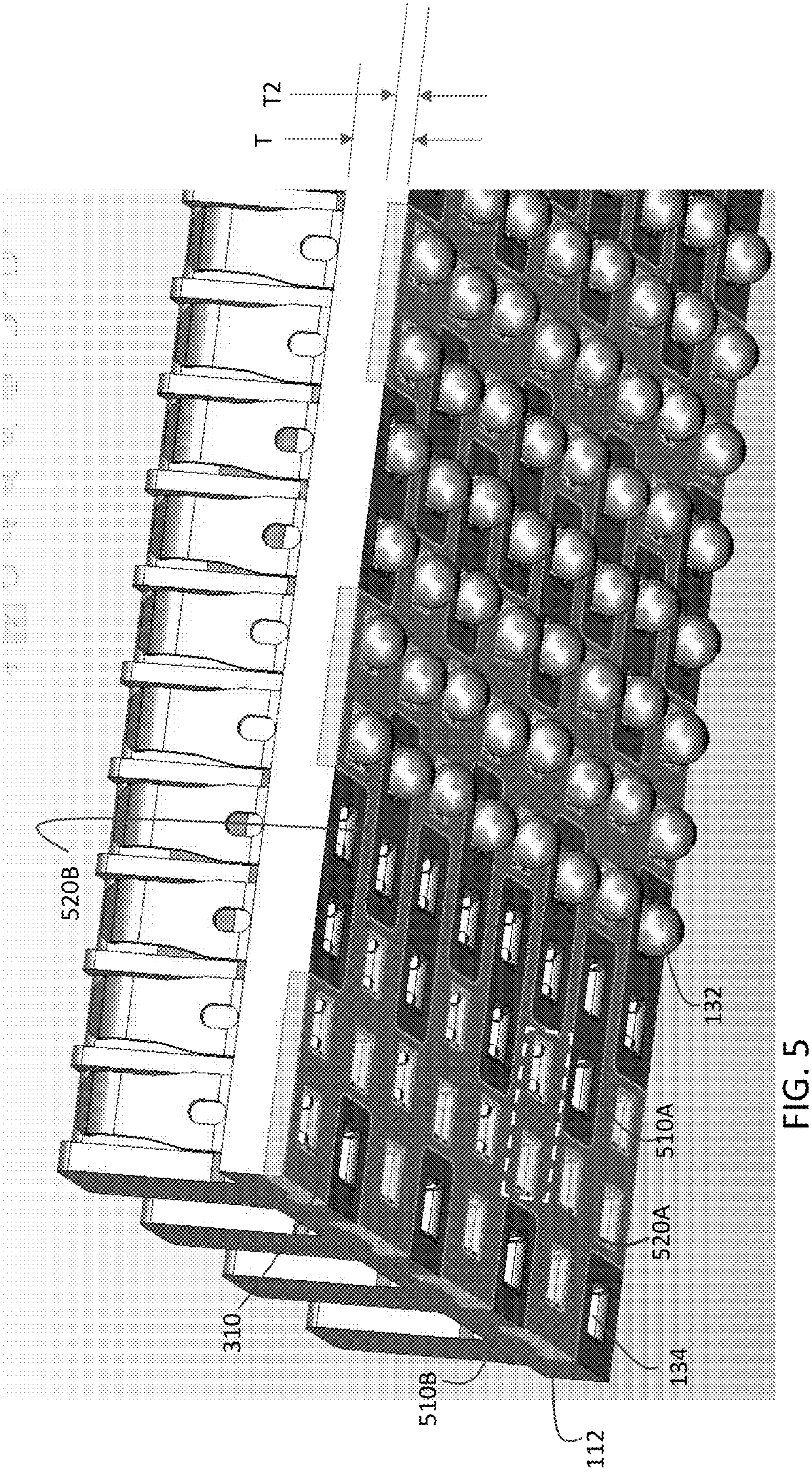
FIG. 5 is an enlarged, bottom view of a portion of the exemplary mezzanine connector of FIG. 2A.

FIG. 4 is an enlarged view of connector 110, revealing additional detail of region 4 identified in FIG. 3. FIG. 4 shows first type regions 420 and second type regions 430. Each type of region is bounded by ribs 322 and configured to receive a contact 118. In first type regions 420 lossy portion 142 is electrically coupled to a contact 118. In second type regions 430, a contact 118 is surrounded by insulative material of the insulative portion 140. The second type regions 430, for example, may be within islands 510A or 510B (FIG. 5).

The first type regions 420 may include insulative material in addition to lossy material. Insulative portion 140 is shown extending into the first type regions. In this example, though, there are sub-regions within first type regions 420 where the lossy material extends fully through the thickness of base 112. These subregions may be formed by projections 442A and 442B of lossy material extending transversely to the mounting surface 130 of connector 110. In this example, the projections 442A and 442B extend from planar regions of lossy material on the lower surface 130 of connector 110 and are perpendicularly to the mounting surface 130.

In this example, each of the first type regions 420 and each of the second type regions 430 includes a slot into which a contact 118 may be inserted. In an example in which each of the first type regions and second type regions receives a contact 118 of the same shape, slot 424 in the first type region and slot 434 in the second type region may have the same shape. The shape of each of slots 424 and 434 may be configured to receive an intermediate portion 314 of a contact 118 and retain the contact 118 within the housing. The slots 424 and 434 may be aligned in a plurality of parallel columns such that the contact 118 may be held in the housing of connector 110 in parallel columns. Each column may be adjacent to and extend parallel to a surface of one of the walls 114A . . . 114D. Within region 4, as visible in FIG. 4, there are two slots 424, each in a first type region 420, and a slot 434 in a second type region 430, aligned along a column. Here, the elongated dimensions of the slots are parallel to the column direction such that the contacts 118 in the column may be aligned edge to edge and configured for edge coupling.

The slots 424 and 434 in this example differ in the proximity of the lossy material to the slot. Within first type regions 420, lossy material bounds portions of the slot. In the example of FIG. 4, projections 442A and 442B bound the upper portion of the slot. Alternatively or additionally, lossy material within a patch 520A or 520B of lossy material may bound the lower portion of the slot. As can be seen in FIG. 4, slots 424 and 434 are elongated and have a width in the column direction, and the projections 442A and 442B have a width, in the column direction, that is less the width of the slots in the column direction. In the illustrated configuration, the lossy material may couple to the contacts 118 in the first type regions 420 without significantly attenuating the signal energy carried by contacts 118 in the second type regions 430.

The first type regions 420 and second type regions 430, in this example, also differ in the shape of the interior surface of wall 114A bounding the back of the region. The first regions have a back surface 426 that is generally planar and, in this example perpendicular to bottom surface 130. Back surface 426 is set back from slot 424 such that a contact 118 inserted in slot 424 is separated from back surface 426 by a sufficient distance that mating portion 312 of contact 118 may deflect towards surface 426. Deflection of mating portion 312 generates force for mating.

The back surface of the second type region 430 is configured to position insulative material of the housing closer to the contact 118 than with a planar surface, such as back surface 426. Such a positioning of insulative material may raise the effective dielectric constant of the material surrounding contact 118 in second type region 430 and lowers the impedance of contact 118 at frequencies within the operating range of connector 110. As a specific example, second type regions 430 may be positioned in pairs such that a pair of contacts may be side-by-side to provide an edge-coupled differential pair. The insulative material within each second type region 430 may be placed to provide a differential impedance on the pair in the range of 88 to 92 Ohms, such as between 90 and 92 Ohms.

In the example of FIG. 4, insulative material is positioned closer to the contact 118 in a second type region 430, without interfering with motion of mating portion 312 of the contact 118, by forming the back surface of the second type region 430 in multiple segments. A top segment 436 is generally parallel to back surface 426 of the first type region. Top segment 436 enables the tip of a contact 118 in second type region 430 clearance to deflect to the same extent as a contact 118 inserted in a first type region 420.

The back surface further includes a tapered segment 438. Tapered segment 438 may taper to match the profile of contact 118 when deflected during mating. In this example, the bottom of tapered segment 438 extends substantially to slot 434, where the contact 118 is anchored and does not deflect during mating. The amount of deflection of contact may increase along the length of contact 118 from the anchor point provided by slot 434 to the tip. Accordingly, tapered segment 438 is set back from slot 434 by an increasing amount until the set back of top segment 436.

FIG. 4 further reveals features that enable a low-profile construction. The inventors have recognized and appreciated that a tool may be used to reliably insert short contacts that enable a low-profile mezzanine connector. The tool, for example, may have a pin that aligns with each of the contacts 118 to be inserted into a slot in the housing. Holes 450 may be included in each of the contacts 118 to receive the pin. Having a hole 450 to receive a pin of an insertion tool enables adequately and precisely controlled downward force to be applied to the contact 118 to firmly seat the contact 118 within the connector housing. Trough 452 may be included in tapered segment 438 to provide clearance for a pin, inserted through a hole 450. In the assembled connector, the hole 450 aligns with trough 452.

FIG. 5 is a bottom, perspective view of connector 110, showing additional details of construction. In this view, solder balls 132 are shown fused to some of the mounting portions of some of the contacts 118. For some of the contacts 118, solder balls are not shown, revealing the mounting portion 310 within a pocket 134 in the lower surface 120. For yet other positions along the columns of slots to receive contacts 118, no contact is illustrated, revealing further detail of the pocket 134.

As can be seen in FIG. 5, base 112 includes islands of insulative material 510A and 510B and patches 520A or 520B of lossy material. Each of the islands of insulative material 510A and 510B extends fully through the base 112. Each of the islands is bounded on at least three sides by the lossy material over at least a portion of the thickness. This lossy material is positioned in patches 520A and 520B of lossy material. In this example, the patches 520A and 520B are disposed across lower surface 120.

In the example of FIG. 5, the islands 510A and 510B are mechanically connected as an integral insulative member. Such a configuration may result from forming the insulative portion of the housing in a first molding shot. In this example, patches 520A each encompass two pockets 134. Patches 520B connect patches 520A. The patches 520A and 520B are mechanically connected as an integral lossy member. Though not visible in FIG. 5, the projections 442A and 442B may be a portion of this integral lossy member. Such a configuration may result from forming the lossy portion of the housing in a second molding shot. Such a configuration may also result in a lossy connection between the projections 442A and 442B.

As can be seen in FIG. 5, base 112 has a thickness T, in a direction perpendicular to bottom surface 120. The thickness T, for example, may be on the order of 1 mm or less, such as between 0.5 and 1.2 mm. Lossy patches 520A and 520B have a thickness T2, which is a fraction of the thickness T. The thickness T2, for example, may be between 10% and 30% of the thickness T. The thickness T2 may approximate the depth of a pocket 134, such that the entire pocket may be formed of the lossy material in a patch 520A. Such a configuration creates a plurality of first type regions in which the insulative material extends partially from the first side to the second side and the lossy material in patches 520A and 520B extends partially from the first side to the second side. There is also in this example a plurality of second type regions, interspersed with the plurality of first type regions, in which the insulative material in islands 510A and 510B extends fully from the first side to the second side.

As can be seen in FIG. 5, lossy patches 520A and insulative islands 510A may alternate along each of the columns. Contacts 118 coupled to the lossy material may be designated as ground conductors. Contacts 118 within the insulative islands 510A may designated as signal conductors. Pairs of contacts in this configuration may carry differential signals, which is the format of high-speed signals in many electronic systems. With these designations, there is a repeating pattern along each column of Ground-Ground-Signal-Signal (G-G-S-S). Adjacent columns may have this pattern offset in the column direction. In this example, adjacent columns are offset by one contact position in the column direction.

FIG. 5 shows one end of the connector where one end of the columns are visible. As can be seen, every other column starts with a lossy patch 520A, such that the column starts, G-G-S-S. Intervening columns start with an island 510B, with one contact 118. In some connectors, the single contact 118 within island 510B may be designated as a low-speed conductors. In many electronic systems, low speed-conductors carry power or ground or control signals or other signals that switch at a low frequency, such as on the order of 1 MHz, for example. For columns that do not start with such a low-speed conductor at the end of the columns visible in FIG. 5, the opposite end of the column may end with such a low-speed conductor within an island 510B.

Figure 6:
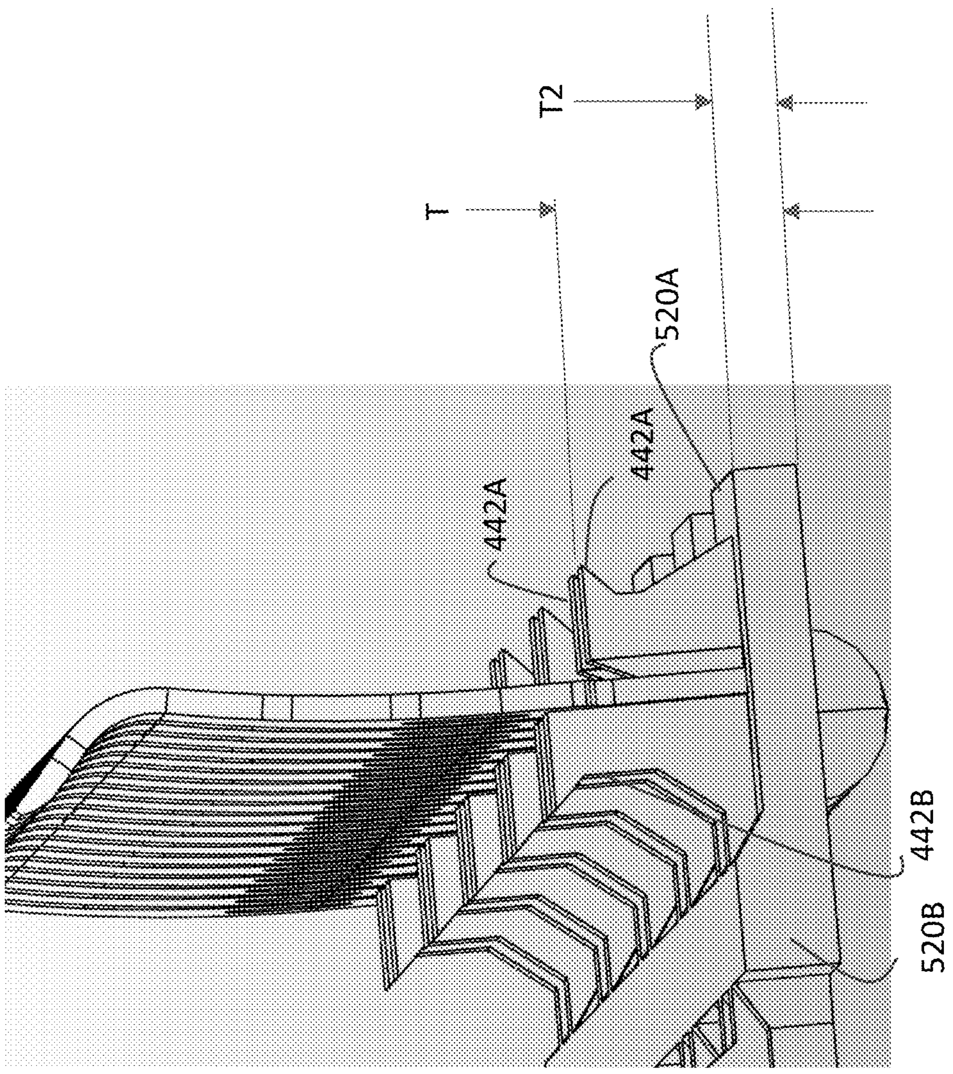
FIG. 6 is a column of contacts in the exemplary mezzanine connector of FIG. 2A, with the insulative portion of the housing cut away.

FIG. 6 shows additional detail of lossy material coupled to a subset of the contacts 118. In this view, a column of contacts 118 in connector 110 is shown without the insulative portions of the housing visible. In this view, it can be seen that lossy projections 442A and 442B are shaped to securely hold a contact 118 between them. In this example, projections 442B have a flat surface abutting a rear side of contact 118. Projections 442A may have a narrow portion abutting the front side of the contact 118. In this example, the narrowed portion is formed by tapering opposing sides of the projection 442A. Such a configuration may facilitate displacement of the material of projection 442A when contact 118 is inserted, ensuring a stable electrical and mechanical connection between the contact 118 and the lossy material of the housing. The interconnection of lossy patches 520A along a column is also visible.

Figure 7:
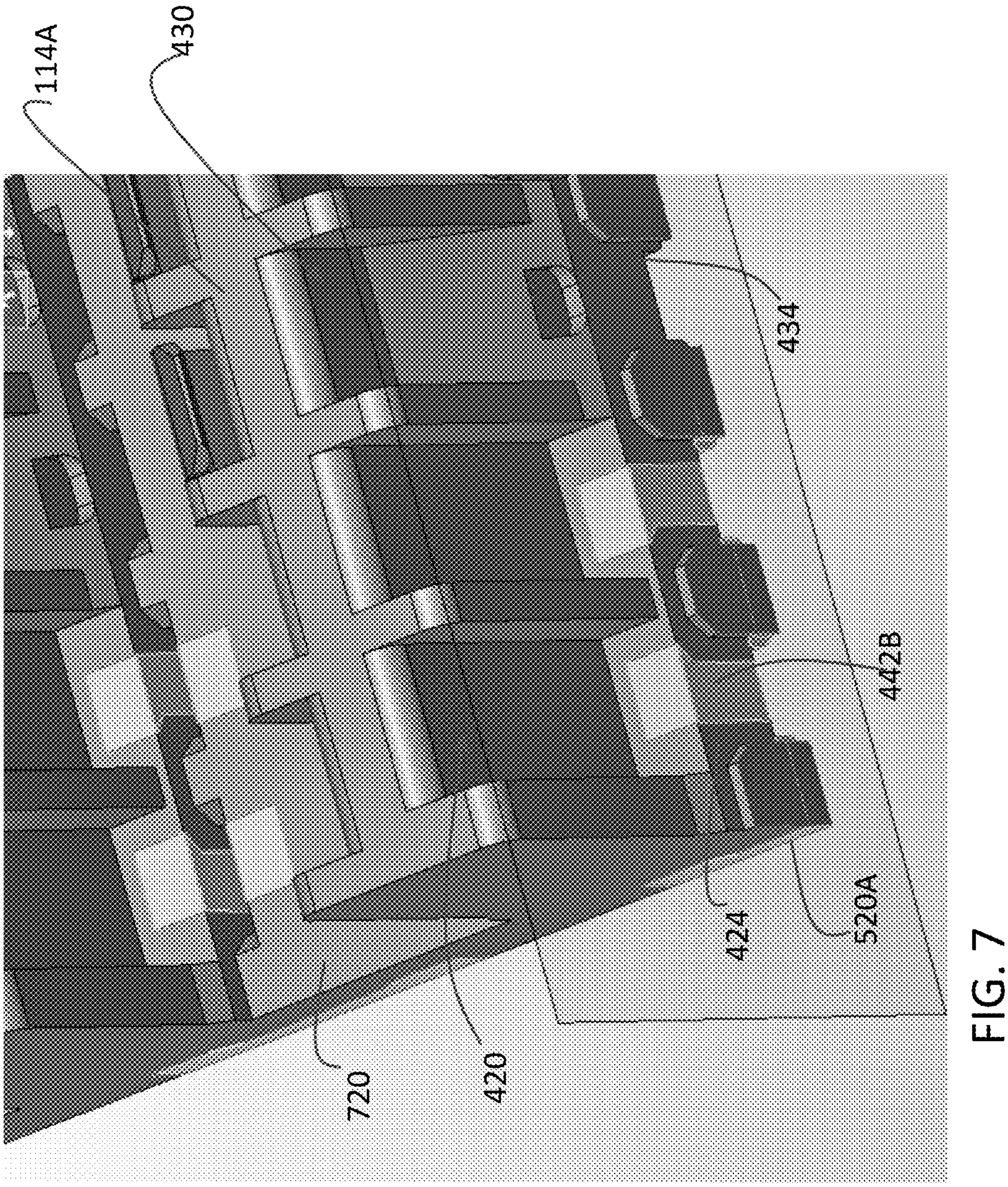
FIG. 7 is a perspective, sectioned view of the portion of the exemplary mezzanine connector of FIG. 2A shown in FIG. 4, without contacts inserted in the slots.

FIG. 7 shows additional detail of the functional differentiation provided by first type regions and second type regions 430. FIG. 7 is a portion of the connector housing cross sectioned in the column direction through the slots of a column. In this view, it can be seen that the slots, such as 424 and 434 extend through the base 112 of the housing. The slots, for example, extend from the lower surface 120 to an upper surface 720. In this example, the slots extend through the base 112 in a direction perpendicular to each of the surfaces 120 and 720. Walls, such as 114A, also extend perpendicularly from surface 720.

Figure 8:
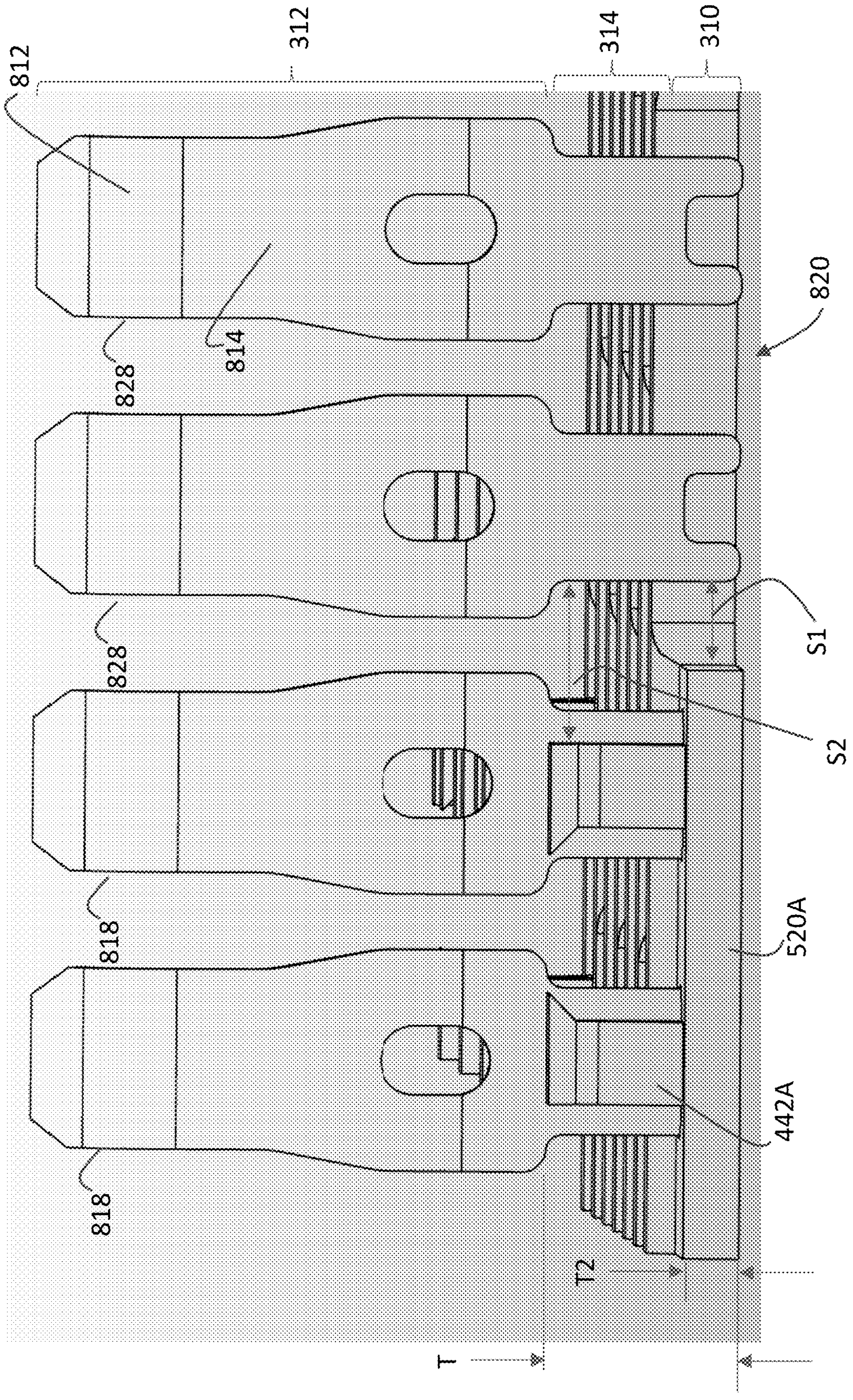
FIG. 8 is a side view of contacts in one portion of a column and with the insulative portion of the housing cut away.

FIG. 8 is a further view of a portion of a column in connector 110. In FIG. 8, the thickness T of the insulative portion is indicated, but the insulative portion of the connector housing is not shown, revealing the lossy portion. FIG. 8 reveals positioning of projections 442A with respect to certain contacts 818, configuring those contacts as ground contacts.

Other contacts 828 are positioned within openings 820 in the lossy material where islands 510A may be formed, configuring contacts 828 as a pair of signal conductors. FIG.

8 shows contacts 828 separated from the lossy patches 520A by a distance S1 and lossy projections 442A by a distance S2. In this example, S2 is larger than S1. Such a configuration enables lossy material to be positioned to couple with contacts 818 while having little or no impact on high-speed signals carried by contacts 828.

The inventors theorize that impact of lossy material on signal conductors is inversely proportional to the distance between a signal contact and lossy material near the signal contact and proportionate to the length of the segment of lossy material near the signal conductor. The arrangement revealed by FIG. 8 shows that the lossy projections, which provide high coupling to ground contacts 818 over the relatively large distance T, and might otherwise have a large impact on signal contacts 828, are separated from signal contacts 828 by a relatively large distance. As a result, the impact on signal contacts 828 from lossy projections 442A is low.

Though lossy patches 520A are closer to the signal contacts 828, they are near the signal contacts over a relatively short distance T2. As a result, the impact on signal contacts 828 from lossy patches 520A is low. Nonetheless, other considerations are met by the design, such as enabling interconnections between the lossy patches coupled to the ground contact 818, which improves signal integrity of the connector and facilitates manufacturability of the connector. Further, pockets on lower surface 120 are each formed of a single material, which aids reliability.

FIG. 8 reveals additional details of representative contacts 818 and 828, which in this example are shaped identically but functionally differentiated by the configuration of the housing. In this example (see also, FIG. 4), the mating portion 312 of each of the contacts is shown with two regions. In region 812, the mating portion 312 may have a convex surface. Region 814 is generally planar. When two contacts mate, the convex region 812 of the first contact may rest against the generally planar region 814 the second contact, and vice versa. Both of the mating portions may deflect, generating a desired amount of normal force to ensure good contact. Moreover, the contact design allows for at least 1 mm of wipe of one contact with respect to the other, even for connectors with a stack height of 4 mm.

The inventors have recognized designs for high-speed and high-performance electronic systems using a mezzanine connector constructed with one or more techniques as described here. The footprint on a printed circuit board to which a connector, such as connector 110 is mounted, may be configured for low crosstalk and precisely controlled impedance matching that of the connector.

Figure 9B:
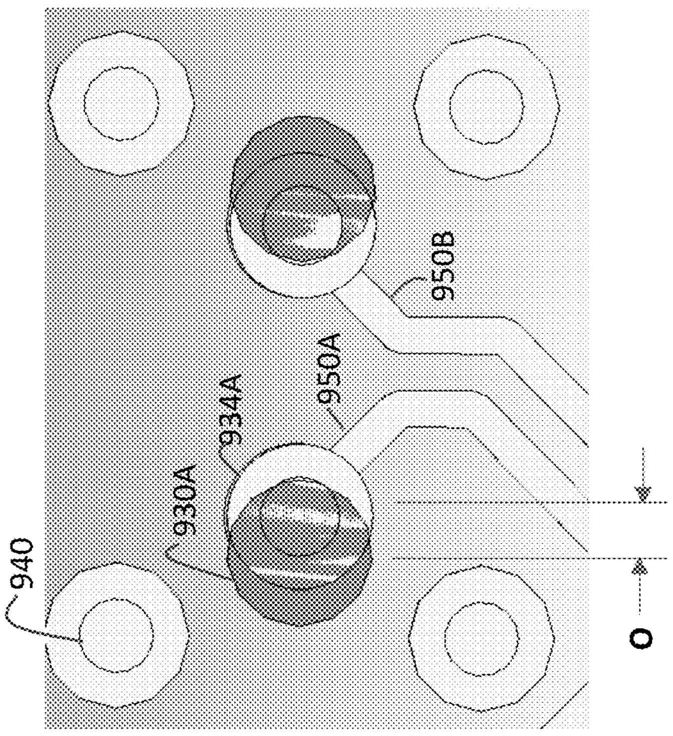
FIG. 9B is a schematic representation of a printed circuit board in a portion of an exemplary connector footprint within the region B of FIG. 9A.
Figure 9A:
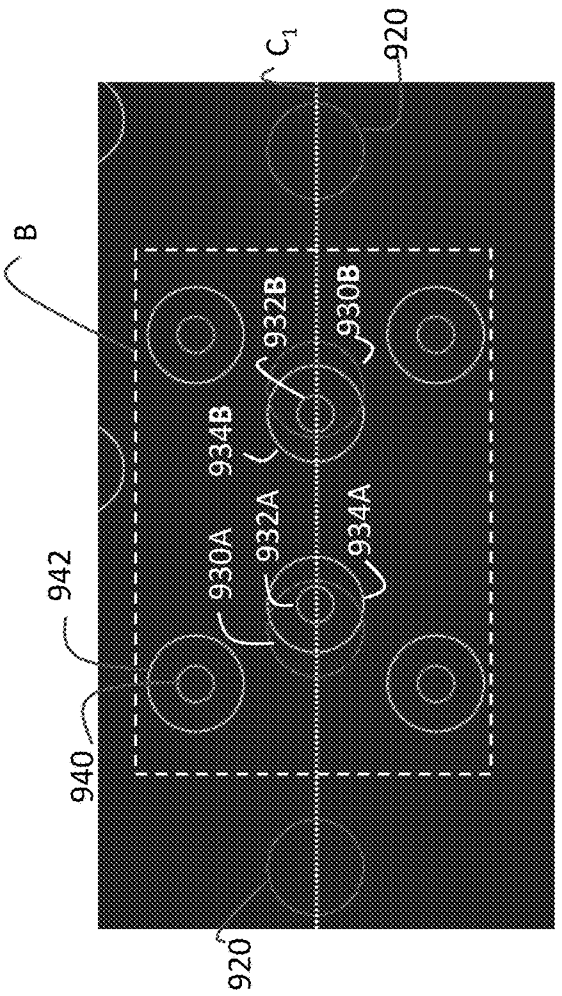
FIG. 9A is a schematic representation of pads on a surface of a printed circuit board in a portion of an exemplary connector footprint.

FIG. 9A is a schematic illustration of a top layer of a printed circuit board (PCB) to which connector 110 may be mounted. This view shows four pads in a column $C_1$ to which solder balls 132 may be soldered. In this example, pads 920 are configured for connection to contacts, such as contacts 818, configured as ground contacts. Though not illustrated in FIG. 9A, each of the pads 920 may be positioned over a via (not pictured in FIG. 9A) extending into the PCB and connecting to ground planes within the PCB. The via for example, may have a drill size of 7 to 10 mils, such as 8 mils. Pads 920 may be formed by coating a surface of the PCB with a solder mask, with an opening in the location of pads 920. The opening may be centered over a ground via. Solder or other metal may then be deposited over the openings in the solder mask, where it will adhere to the PCB in the shape of pad 920.

Pads 930A and 930B may be similarly formed over signal vias 932A and 932B, respectively. These vias may have a drill size of 7 to 10 mils, such as 8 mils for example. Signal vias 932A and 932B are connected to signal traces 950A and 950B (FIG. 9B), respectively, within the PCB. In this example, pads 930A and 930B are in column $C_1$ with pads 920. The pads are uniformly spaced along the column in this example. The pad to pad spacing may be a uniform spacing of 1 mm on center, for example.

In use, solder balls 132 fused to signal contacts, such as contacts 828, may align with pads 930A and 930B. During reflow processing, those solder balls may fuse to pads 930A and 930B for mounting the connector to the PCB. Pads 930A and 930B are electrically coupled to signal vias 932A and 932B, respectively, such that the signal contacts connected to mounting pads 930A and 930B via a solder ball are connected to signal vias 932A and 932B.

In this example, signal vias 932A and 932B have a center-to-center separation that is different than the center-to-center separation of pads 930A and 930B to which solder balls are fused. In this example, the center-to-center separation of pads 930A and 930B may match the center-to-center separation of signal contacts 828 or, if the solder balls fused to signal contacts 828 are not centered with respect to the contacts, the center-to-center separation of those solder balls. The center-to-center separation of signal vias 932A and 932B, in contrast, may be selected to provide a desired impedance within the signal vias. In this example, the separation between a pair of signal vias is less than the separation between the mounting pads 930A and 930B. Such a configuration may provide a differential impedance within the signal vias of 90 Ohms+/−2 Ohms, for example.

FIG. 9B shows that the signal vias 932A and 932B are each offset from the mounting pads 930A and 930B, respectively, by a distance O. The distance O may be in the range of 5-15%, or 8-12% or about 10% in some examples, of the center-to-center separation of the mounting pads 930A and 930B. As a specific example, the center-to-center separation of the mounting pads 930A and 930B may be approximately 1 mm, while the center-to-center separation of signal vias 932A and 932B may be 0.8 mm.

This configuration may be achieved by depositing a solder mask with openings through which pads 930A and 930B are to be formed offset with respect to signal vias 934A and 934B. In the illustrated example, each of the signal vias has an associated via pad 934A or 934B. Such pads may be formed during electrodeposition of plating within the signal vias 932A and 932B and may have a higher copper content than mounting pads 930A and 930B, which may have a higher tin content than via pads 934A and 934B. Nonetheless, the mounting pads 930A and 930B and the via pads 934A and 934B may have sufficient overlap to provide electrical connection between them, and the signal vias themselves.

Additionally, the footprint may include one or more shadow vias 940. The shadow vias 940 may be connected to ground layers within the PCB. The shadow vias may have associated via pads 942, but in this example do not have associated mounting pads. The shadow vias may improve signal integrity. In this case, four shadow vias 940 are positioned around the signal vias of one pair.

The configuration of signal, ground and shadow vias shown in FIGS. 9A and 9B may be extended along the column and in parallel columns, with signal and ground vias matching the signal and ground contacts of the connector. Additionally, the footprint may include pads aligned with contacts for low-speed signals. Those pads may be configured as pads 920 or 930A or 930B. In some examples, the low-speed signal contacts may be connected to ground planes within the PCB or may be connected to traces.

The present disclosure is not limited to the details of construction, or the arrangements of components set forth in the foregoing description and/or the drawings. Various embodiments are provided solely for purposes of illustration, and the concepts described herein are capable of being practiced or carried out in other ways. Having thus described several aspects of at least one embodiment of this invention, it is to be appreciated that various alterations, modifications, and improvements will readily occur to those skilled in the art.

For example, the solder balls attached to the contacts are shown with the same center to center spacing as the mating portions of the contacts. Such a configuration results from aligning, in a direction perpendicular to the mounting interface of the connector, the centers of the mating portions and the features, such as the two "teeth" of the mounting portions of the contacts. In other examples, the centerlines of mounting portions may be offset from the center lines of the respective contact portions. For contacts configured as a differential pair, the centerlines of the mounting portions of the two contacts of the pair may be offset toward each other. In such a configuration, the center to center spacing of the contact portions of a pair may be approximately 1 mm, for example, and the center to center spacing of the mounting portion of the same pair may be 0.8 mm.

As another example, the mounting ends of contacts may be shaped in various ways to accommodate solder ball attachment. The contacts may be bent as illustrated in FIG. 1B to facilitate attachment to a surface of the tails parallel to the mounting interface of the connector. Alternatively, the mounting ends may be shaped for the solder balls to fuse to opposing sides of the mounting end that are perpendicular to the mounting interface or to fuse preferentially to edges of the mounting ends facing the mounting the interface. For example, the mounting ends of the contacts may have edges that are solder-wettable with surfaces joining the edges having a non-solder wettable (also known as anti-wettable) coating.

Alternatively or additionally, the mounting ends of the tails can include projections that extend into pockets formed in a surface of the housing configured for mounting against the circuit assembly. These projections may have edges that are solder-wettable, which may aid in attachment of the solder balls to the contacts. The edges may be made solder-wettable by application of solder flux, such as through the use of a flux pin transfer technique. Alternatively or additionally, the edges may be made solder-wettable by coating a solder-wettable layer to the edges, such as a layer of copper, gold, nickel, nickel-vanadium alloy.

As another example, a connector in which lossy material coupled to each of multiple columns of contacts 118 was described as being formed as an integral member. In other examples, the lossy material coupled to contacts in one column or a subset of columns may be formed as a separate member, resulting in multiple such lossy members within the connector.

As another example, FIG. 2A shows a portion of a connector with eight columns of contacts. A connector may be formed with more or fewer columns and with more or fewer contacts in each column.

Moreover, connectors were illustrated in which contacts designated as signal contacts and contacts designated as ground contacts have the same shape. In the illustrated examples, two ground contacts are positioned between each pair of signal contacts. Alternatively, in place of those two ground contacts, a single wider ground contact could be used.

In the example of FIG. 2A, there is a column of contacts adjacent each of two opposing surfaces of each of the walls, but in other examples, there may be contacts adjacent only one surface of some or all of the walls. Moreover, the column of contacts may extend along only a portion of the wall or at discontinuous regions along the wall.

As another example, FIGS. 9A and 9B show circular pads for solder ball attachment. In other examples, the pads may have another symmetrical shape, such as square. It is not a requirement, however, that the pads be symmetrical.

Figure 10:
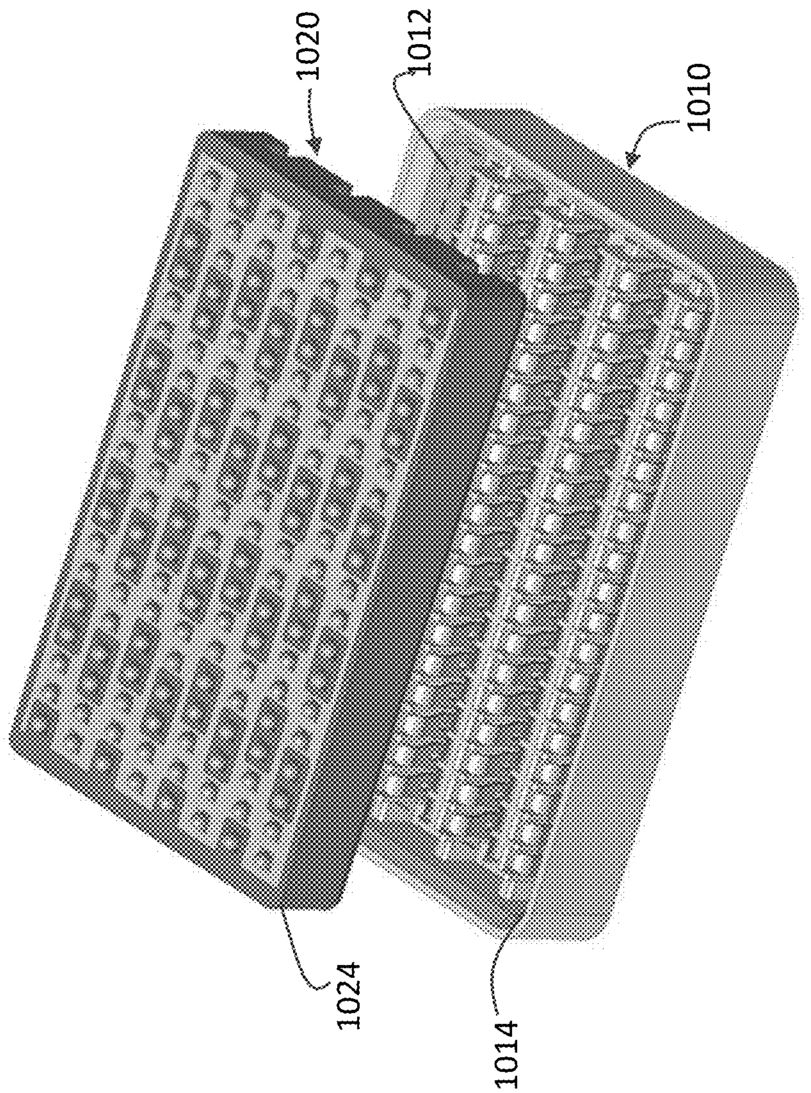
FIG. 10 is a perspective view of two connectors, each with a field of contacts with a plurality of columns as illustrated in FIG. 2A, and each with a housing having perimeter walls configured for mating.

As yet a further example, FIGS. 2A and 2B illustrate a field of contacts of a connector. Such a field of contacts may be combined with other structures in a connector, such as field 1012 illustrated in FIG. 10. The insulative housing of the connector 1010 in this example includes perimeter walls 1014 surrounding the field 1012. A second connector 1020 may similarly include a field of contacts, and perimeter walls 1024. To facilitate mating of connectors 1010 and 1020, the perimeter walls 1014 and 1024 may be complementary. In this example, walls 1024 fit within the perimeter established by walls 1014.

Such alterations or modifications are intended to be part of this disclosure and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A low-profile mezzanine connector, comprising:

a housing comprising insulative material in an insulative portion and lossy material in a lossy portion, the housing comprising a plurality of slots disposed in a plurality of columns wherein the lossy portion comprises a plurality of projections adjacent to open sides of slots of a subset of the slots in each of the plurality of columns; and a plurality of contacts adjacent to the open sides of respective slots, each comprising a portion in the respective slot of the plurality of slots.

2. The low-profile mezzanine connector of claim 1, wherein:

the contacts of the plurality of contacts in the subset of the slots in each of the plurality of columns has a first width in a column direction; and the plurality of projections have a second width in the column direction that is less than the first width.

3. The low-profile mezzanine connector of claim 2, wherein:

projections of the plurality of projections bound opposite sides of each of the plurality of slots in the subset of the slots.

4. The low-profile mezzanine connector of claim 2, wherein:

the housing comprises a surface;

the plurality of slots extend perpendicular to the surface;

the lossy portion comprises a first portion extending parallel to the surface; and the plurality of projections extend from the first portion in a direction perpendicular to the surface.

5. The low-profile mezzanine connector of claim 1, wherein:

the subset is a first subset of the slots;

each of the plurality of columns comprises a second subset of slots; and within each column of the plurality of columns the slots are arranged in a repeating pattern with groups of one or more slots of the second subset disposed between groups of one or more slots of the first subset.

6. The low-profile mezzanine connector of claim 5, wherein:

the housing comprises a surface;

the plurality of slots extend perpendicular to the surface;

the projections have a first height in a direction perpendicular to the surface;

the lossy material adjacent slots of the second subset has a second height in a direction perpendicular to the surface; and the second height is less than the first height.

7. The low-profile mezzanine connector of claim 5, wherein:

the housing comprises a base and a plurality of walls extending from the base;

the base of the housing comprises a plurality of islands of the insulative material extending through the base;

the groups of one or more slots of the second subset extend through respective islands of the plurality of islands; and each of the islands is bounded on at least three sides by the lossy material.

8. The low-profile mezzanine connector of claim 7, wherein:

the base has a first side and a second side, opposite the first side;

the plurality of slots extend through the base from the first side to the second side;

the plurality of walls extend perpendicularly from the first side of the base;

the second side of the base comprises a plurality of pockets;

the plurality of contacts each comprises a mating portion, a mounting portion and an intermediate portion joining the mating portion and the mounting portion; and for each of the plurality of contacts:

the intermediate portion is disposed within a slot of the plurality of slots;

the mating portion extends from the base adjacent a wall of the plurality of walls; and the mounting portion extends into a pocket of the plurality of pockets.

9. The low-profile mezzanine connector of claim 8, wherein:

one of the first side or the second side of the base comprises patches of the lossy portion interspersed with the plurality of islands.

10. The low-profile mezzanine connector of claim 7, wherein:

the lossy portion extends continuously across the base so that a continuous region of lossy material surrounds two or more of the islands.

11. The low-profile mezzanine connector of claim 10, wherein:

the insulative material comprises a thermoplastic material filled with nonconductive fibers and the lossy material comprises thermoplastic material filled with carbon fiber.

12. The low-profile mezzanine connector of claim 1, wherein:

the low-profile mezzanine connector is a first connector;

the first connector is mated to a second connector to provide an interconnection with a stack height of 4 mm or less, the second connector comprising:

a second housing comprising insulative material in an insulative portion and lossy material in a lossy portion, the second housing comprising a plurality of slots disposed in a plurality of columns, wherein the lossy portion comprises a plurality of projections adjacent to a subset of the slots in each of the plurality of columns; and a plurality of contacts, each comprising a portion in a respective slot of the plurality of slots.

13. A low-profile mezzanine connector, comprising:

a housing comprising insulative material in an insulative portion and lossy material in a lossy portion; and a plurality of contacts disposed in a plurality of columns, wherein:

the housing comprises a base having a first side and a second side, opposite the first side;

the housing comprises a plurality of walls extending from the first side of the base;

the plurality of contacts each comprises a mating portion, a mounting portion and an intermediate portion joining the mating portion and the mounting portion; and for each of the plurality of contacts:

the intermediate portion is disposed in the base;

the mating portion extends from the base adjacent a wall of the plurality of walls; and the base comprises:

a plurality of first type regions in which the insulative material extends partially from the first side to the second side and the lossy material extends partially from the first side to the second side; and a plurality of second type regions, interspersed with the plurality of first type regions, in which the insulative material extends fully from the first side to the second side.

14. The low-profile mezzanine connector of claim 13, wherein:

in the plurality of first type regions the lossy material is exposed at the second side of the base.

15. The low-profile mezzanine connector of claim 13, wherein:

one or more contacts of the plurality of contacts are disposed within respective first type regions; and pairs of the plurality of contacts are disposed within respective second type regions.

16. The low-profile mezzanine connector of claim 15, wherein:

the lossy material in the respective first type regions is electrically coupled to the one or more contacts of the plurality of contacts disposed within the respective first type region.

17. The low-profile mezzanine connector of claim 15, wherein:

the lossy material in the respective first type regions contacts the one or more contacts of the plurality of contacts disposed within the respective first type region.

18. The low-profile mezzanine connector of claim 13, wherein:

the lossy material in the plurality of first type regions is electrically interconnected.

19. The low-profile mezzanine connector of claim 18, wherein:

the lossy material in the plurality of first type regions comprises a thermoplastic material with conductive fillers molded into the insulative portion of the housing.

20. The low-profile mezzanine connector of claim 13, wherein:

the low-profile mezzanine connector is a first connector;

the first connector is mated to a second connector to provide an interconnection with a stack height of 4 mm or less, the second connector comprising:

a second housing comprising insulative material in an insulative portion and lossy material in a lossy portion; and a plurality of contacts disposed in a plurality of columns, wherein:

the second housing comprises a base having a first side and a second side, opposite the first side;

the housing comprises a plurality of walls extending from the first side of the base;

the plurality of contacts each comprises a mating portion, a mounting portion and an intermediate portion joining the mating portion and the mounting portion; and for each of the plurality of contacts:

the intermediate portion is disposed in the base;

the mating portion extends from the base adjacent a wall of the plurality of walls; and the base comprises:

a plurality of first type regions in which the insulative material extends partially from the first side to the second side and the lossy material extends partially from the first side to the second side;

a plurality of second type regions, interspersed with the plurality of first type regions, in which the insulative material extends fully from the first side to the second side.

21. A low-profile mezzanine connector, comprising:

a housing comprising a base having a first side and a second side, opposite the first side, and a plurality of insulative walls extending from the first side of the base; and a plurality of contacts disposed in a plurality of columns, wherein:

the plurality of contacts each comprises a mating portion, a mounting portion and an intermediate portion joining the mating portion and the mounting portion; and for each of the plurality of contacts:

the intermediate portion is disposed in the base; and the mating portion extends from the base adjacent a wall of the plurality of walls; and for at least a subset of the plurality of contacts, a portion of a wall of the plurality of walls adjacent to the contact is tapered adjacent the base, whereby an impedance of the contacts in the subset is lowered.

22. The low-profile mezzanine connector of claim 21, wherein:

the impedance of the contacts in the second set is between 88 and 92 Ohms.

23. The low-profile mezzanine connector of claim 21, wherein:

the subset is a first subset of the plurality of contacts;

for a second subset of the plurality of contacts, a wall of the plurality of walls adjacent to the contact is perpendicular to the base.

24. The low-profile mezzanine connector of claim 23, wherein:

the housing further comprises a lossy portion adjacent contacts of the second subset of contacts.

25. The low-profile mezzanine connector of claim 24, wherein:

contacts of the first subset of contacts and contacts of the second subset of contacts have a same shape.

26. The low-profile mezzanine connector of claim 24, wherein:

contacts of the first subset of contacts and contacts of the second subset of contacts comprise an opening therethrough adjacent the base.

27. The low-profile mezzanine connector of claim 26, wherein:

the low-profile mezzanine connector is a first connector;

the first connector is mated to a second connector to provide an interconnection with a stack height of 4 mm or less, the second connector comprising:

a second housing comprising a base having a first side and a second side, opposite the first side, and a plurality of insulative walls extending from the first side of the base; and a plurality of contacts disposed in a plurality of columns, wherein:

the plurality of contacts each comprises a mating portion, a mounting portion and an intermediate portion joining the mating portion and the mounting portion; and for each of the plurality of contacts:

the intermediate portion is disposed in the base; and the mating portion extends from the base adjacent a wall of the plurality of walls; and for at least a subset of the plurality of contacts, a portion of a wall of the plurality of walls adjacent to the contact is tapered adjacent the base, whereby an impedance of the contacts in the subset is lowered.

28. The mated connectors of claim 27, wherein:

the plurality of contacts of the first connector and the plurality of contacts of the second connector are mated to provide at least 15 differential signal connections per $cm^2$.

* * * * *